(12) United States Patent
Yamazaki et al.

(10) Patent No.: US 9,430,161 B2
(45) Date of Patent: Aug. 30, 2016

(54) STORAGE CONTROL DEVICE AND CONTROL METHOD

(71) Applicant: FUJITSU LIMITED, Kawasaki-shi, Kanagawa (JP)

(72) Inventors: Akito Yamazaki, Kawasaki (JP); Yoshimasa Mishuku, Yokohama (JP); Hiroshi Murayama, Fuji (JP); Kazunori Kobashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 14/225,493

(22) Filed: Mar. 26, 2014

(65) Prior Publication Data
US 2014/0297955 A1    Oct. 2, 2014

(30) Foreign Application Priority Data

Mar. 29, 2013   (JP) .................................. 2013-074825

(51) Int. Cl.
*G06F 12/08* (2016.01)
*G06F 3/06* (2006.01)

(52) U.S. Cl.
CPC .............. *G06F 3/0638* (2013.01); *G06F 3/061* (2013.01); *G06F 3/0604* (2013.01); *G06F 3/065* (2013.01); *G06F 3/0659* (2013.01); *G06F 3/0683* (2013.01); *G06F 3/0689* (2013.01); *G06F 12/0802* (2013.01)

(58) Field of Classification Search
CPC . G06F 12/0802; G06F 3/0638; G06F 3/0604; G06F 3/0683; G06F 3/0689; G06F 3/061; G06F 3/065; G06F 3/0659

USPC ................. 711/170, 112, 114, 118, 162, 202
See application file for complete search history.

(56) References Cited

U.S. PATENT DOCUMENTS

| | | | |
|---|---|---|---|
| 7,085,785 B2 * | 8/2006 | Sawdon | G06F 17/30067 709/217 |
| 8,677,054 B1 * | 3/2014 | Meir et al. | 711/103 |
| 2006/0200502 A1 * | 9/2006 | Tanaka | G06F 8/665 |
| 2010/0250885 A1 | 9/2010 | Nakata | |
| 2011/0179217 A1 | 7/2011 | Hsiao | |

(Continued)

FOREIGN PATENT DOCUMENTS

| | | |
|---|---|---|
| JP | 2004-118413 | 4/2004 |
| JP | 2010-238009 | 10/2010 |

OTHER PUBLICATIONS

Extended European Search Report dated Jul. 25, 2014 for corresponding European Patent Application No. 14161259.8, 8 pages.

*Primary Examiner* — Pierre-Michel Bataille
(74) *Attorney, Agent, or Firm* — Fujitsu Patent Center

(57) ABSTRACT

The first storage area stores original data of an update target that is to be updated by a host. The controller divides data to be written over the original data of the update target stored in the first storage area into a plurality of pieces of update data and thereby distributes the plurality of pieces of update data for each of successive addresses. The second storage area stores the plurality of update data distributed by the controller. The third storage area stores information in which an update area address, which is an address of the first storage area to be overwritten by the plurality of pieces of update data of the original data of the update target, is associated with a storage destination address, which is an address of the second storage area that has stored the plurality of pieces of update data.

7 Claims, 25 Drawing Sheets

(56) References Cited

U.S. PATENT DOCUMENTS

| | | |
|---|---|---|
| 2011/0258404 A1 | 10/2011 | Arakawa et al. |
| 2014/0129881 A1* | 5/2014 | De Schrijver et al. ...... 714/47.2 |
| 2014/0181042 A1* | 6/2014 | Toyama et al. ............... 707/652 |
| 2014/0289451 A1* | 9/2014 | Ho ...................... G06F 12/0246 711/103 |

* cited by examiner

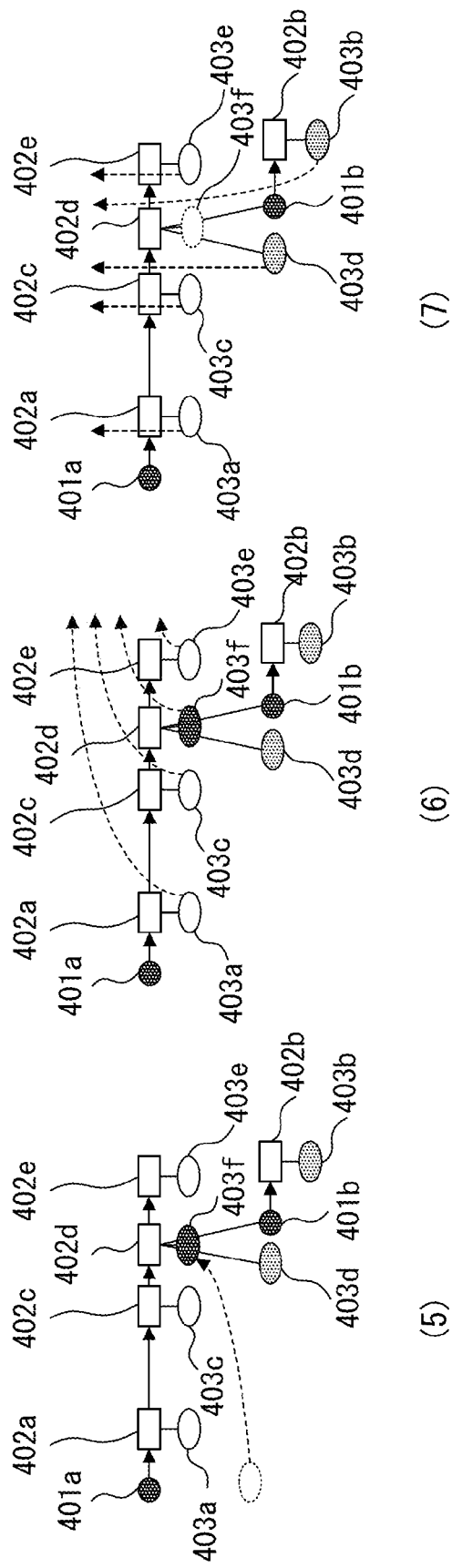
F I G. 6 B

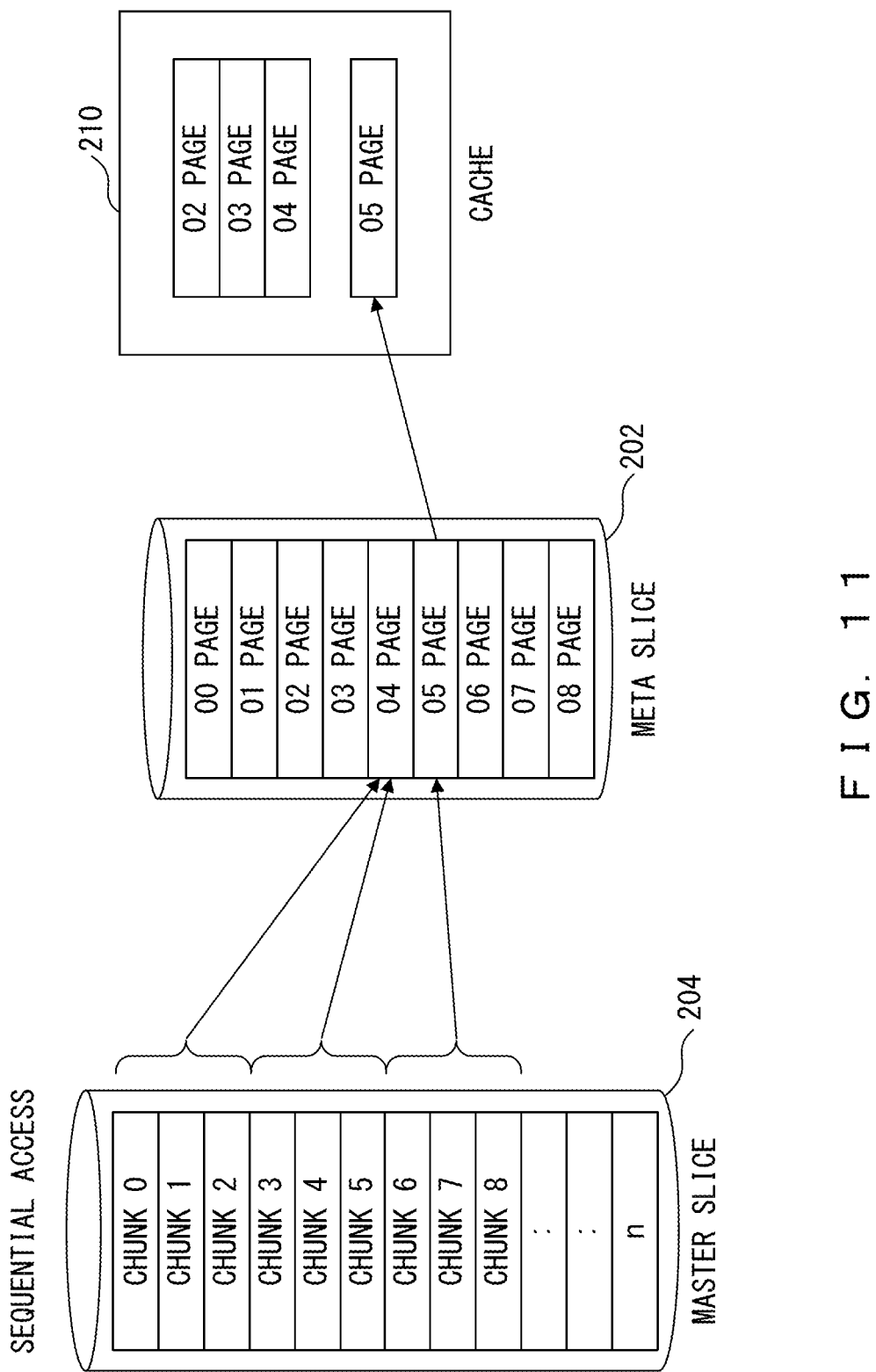
F I G. 11

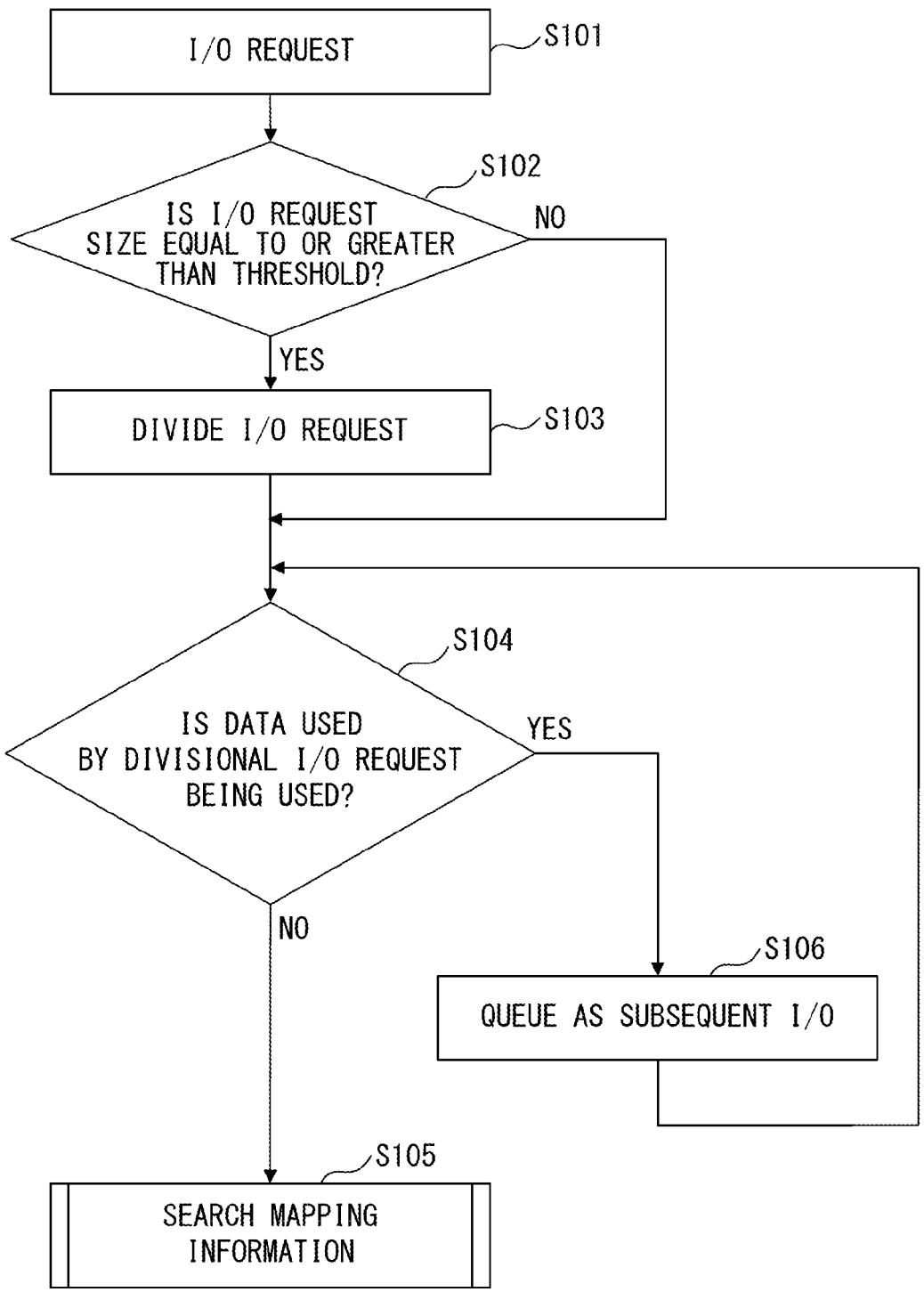
F I G. 1 2

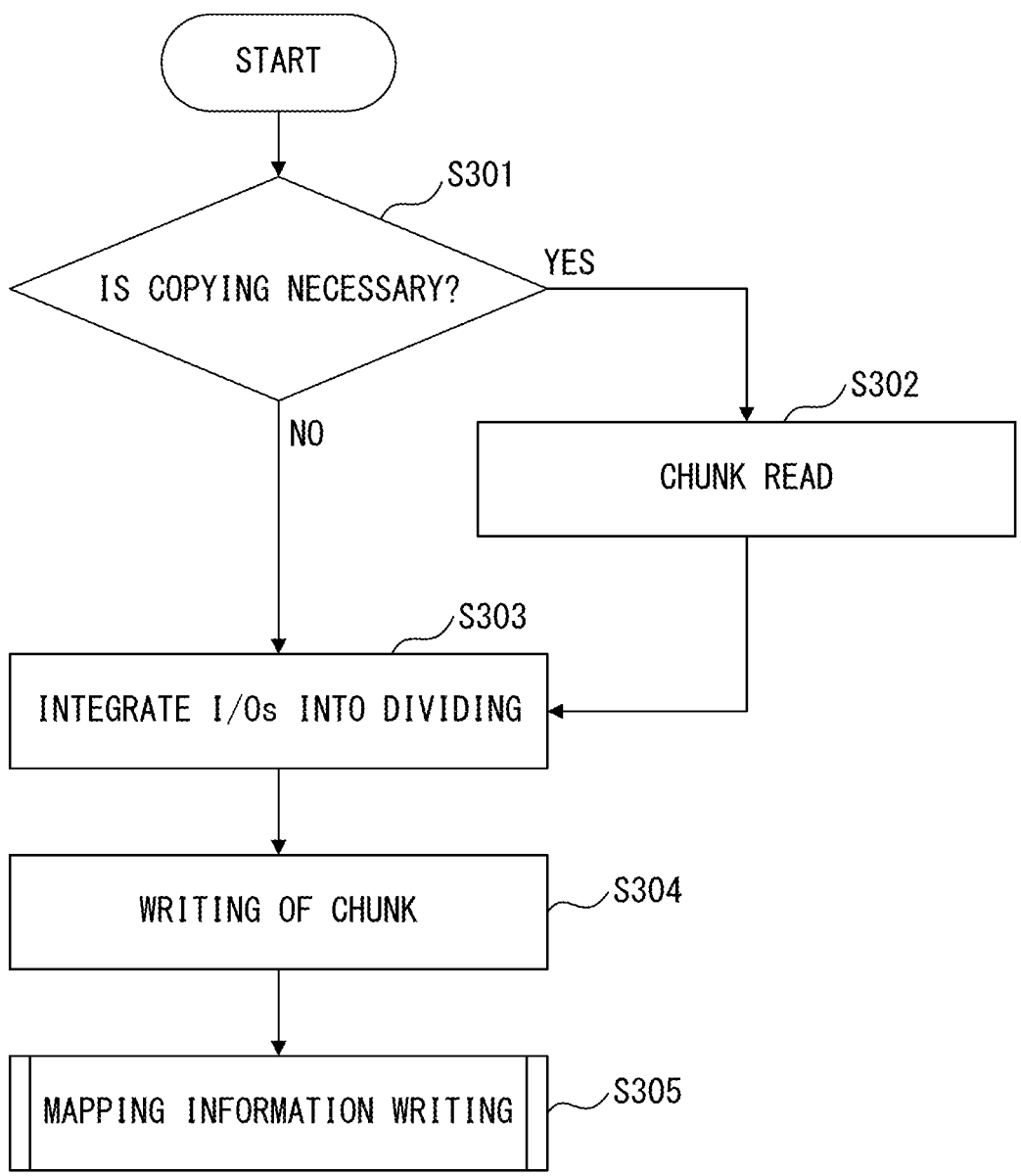
F I G. 1 4

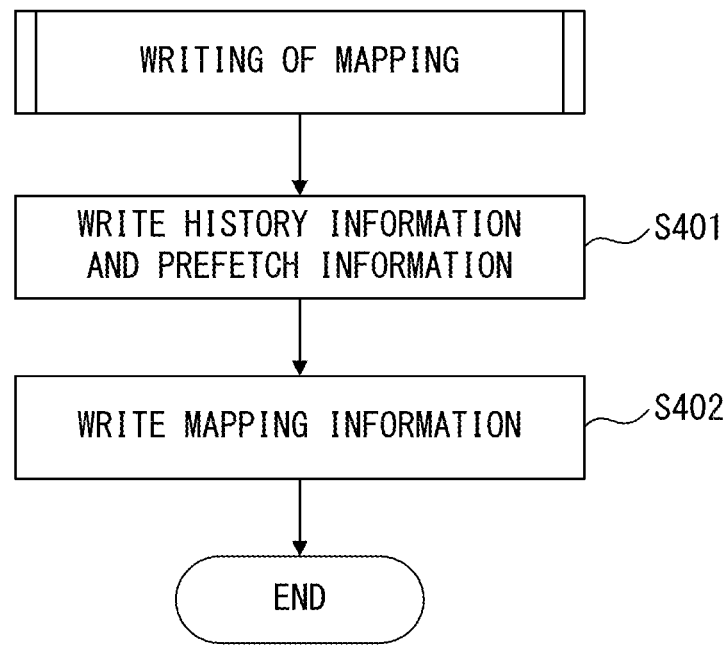
F I G. 1 5

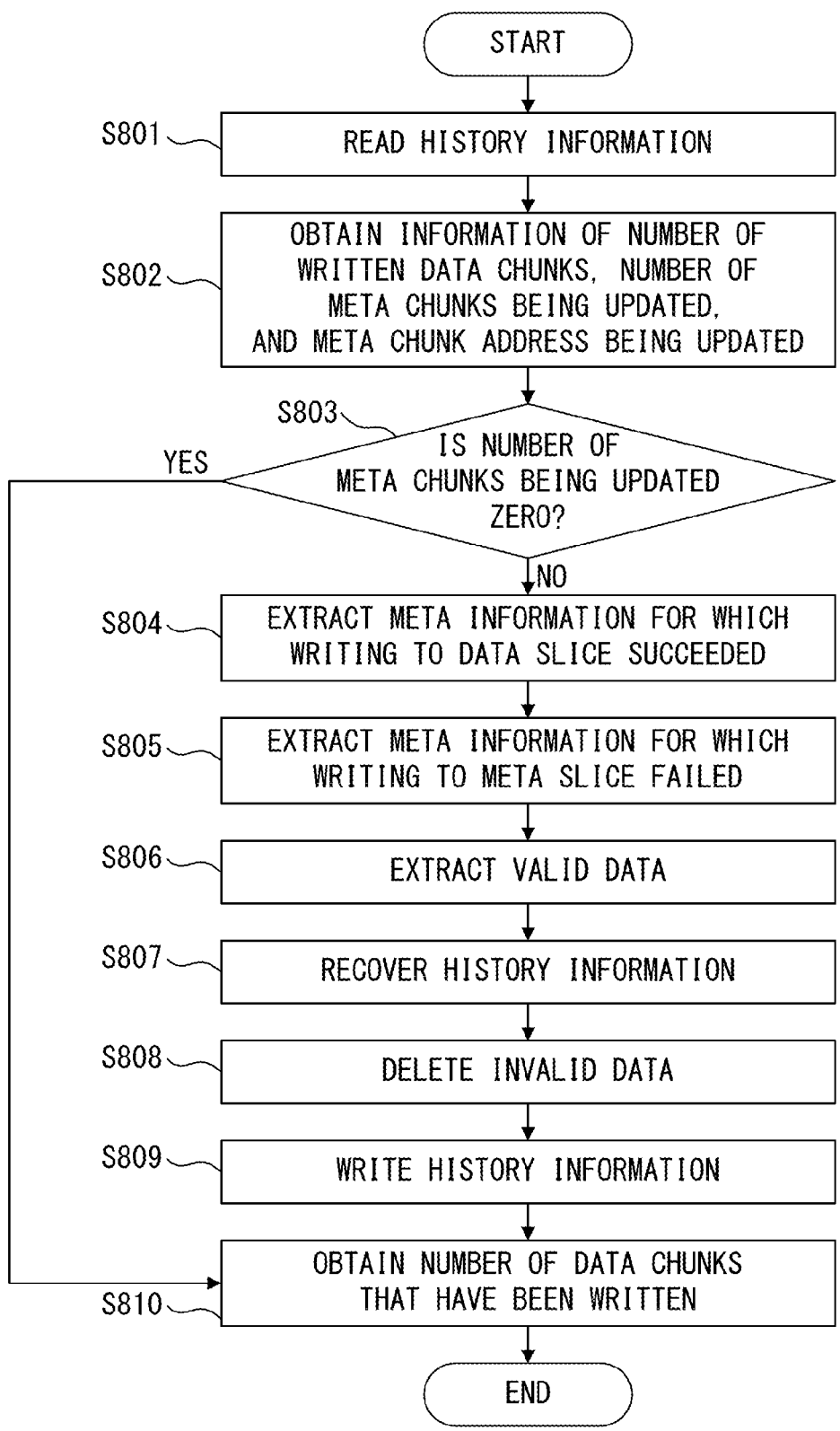
F I G. 1 9

STORAGE CONTROL DEVICE AND CONTROL METHOD

CROSS-REFERENCE TO RELATED APPLICATION

This application is based upon and claims the benefit of priority of the prior Japanese Patent Application No. 2013-074825, filed on Mar. 29, 2013, the entire contents of which are incorporated herein by reference.

FIELD

The embodiments discussed herein are related to a storage control device.

BACKGROUND

A storage device is a device that has a large number of harddisk drives and large capacity cache memories and stores data used by, for example, servers. A storage device provides a function of snapshot, which holds an image of data at a particular moment. Snapshot is performed in response to a request from, for example, a server. As a snapshot function, there is for example a Copy-On-Write (referred to as COW hereinafter) method. Snapshot does not perform a process of copying copy source data as it is. Snapshot performs a process of obtaining meta information related to copy source data, resulting in an advantage that it only requires a short period of time for backup. However, when copy source data is updated with the meta information having been backed up, data at the moment of taking a snapshot is overwritten, making it impossible to refer to the data later. Accordingly, in a storage device that uses snapshot of the COW method, when data is to be updated after obtaining a snapshot, data blocks including the data before the update are saved to a different address. The storage device obtains meta information corresponding to the area in which the data blocks are saved, and writes data to be updated over the saved data.

A storage device using snapshot of the COW method refers to copy source data as master slices, and manages them in units called chunks. Also, a storage device includes a COW slice that holds data to be used for snapshot. In snapshot, when data has been updated, the storage device stores data obtained by updating the data of a master slice in a data area of a COW slice. For this storing, the storage device stores, in a COW slice and as meta information, mapping information that associates a (physical) address at which data of a master slice was stored and a (logical) address of a COW slice that is a saving destination.

Accompanying the increase in the scale of storage devices and systems, the amount of mapping information for managing chunks of COW slices tend to increase. An increase in the amount of mapping information leads to an increase in the number of accesses to COW slices, which also increases the usage amount of memories in a storage device. This results in deterioration in the performance of snapshot. It is desirable that the performance of snapshot be maintained even when the amount of mapping information has increased.

As a technique of maintaining the performance of snapshot, a technique is known that distributes loads of generating snapshots between a host and a storage device (see Patent Document 1 for example).

Patent Document 1: Japanese Laid-open Patent Publication No. 2004-118413

SUMMARY

According to an aspect of the embodiments, a storage control device comprising: a first storage area configured to store original data of an update target that is to be updated by a host; a controller configured to divide data to be written over the original data of the update target stored in the first storage area into a plurality of pieces of update data and thereby to distribute the plurality of pieces of update data for each of successive addresses; a second storage area configured to store the plurality of update data distributed by the controller; and a third storage area configured to store information in which an update area address, which is an address of the first storage area to be overwritten by the plurality of pieces of update data of the original data of the update target, is associated with a storage destination address, which is an address of the second storage area that has stored the plurality of pieces of update data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6B illustrates an example of the integration of write requests to hold successive physical addresses;

FIG. 11 illustrates an example of prefetch of meta data;

FIG. 12 is a flowchart that explains an example of a process performed by a control unit that has received an I/O request;

FIG. 14 is a flowchart that explains an example of a process related to copying of data;

FIG. 15 is a flowchart that explains a process in which the control unit writes meta information to a meta slice;

FIG. 19 illustrates a flowchart explaining an example of down recovery of history information.

DESCRIPTION OF EMBODIMENTS

Figure 1:
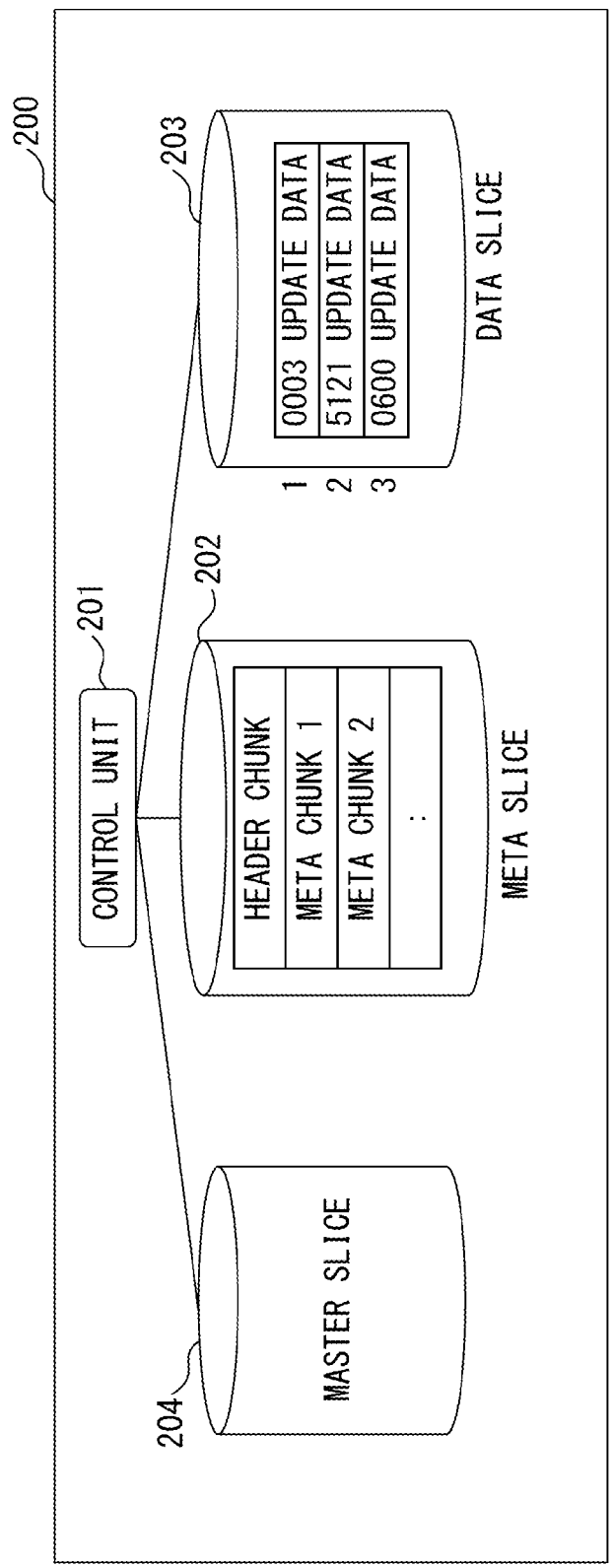
FIG. 1 illustrates an example that explains a storage device.

Hereinafter, detailed explanations will be given for the present embodiment by referring to the drawings.

FIG. 1 illustrates an example that explains a storage device. A storage device 200 illustrated in FIG. 1 includes a control unit 201, a meta slice 202, a data slice 203, and a master slice 204. The control unit 201 controls processes of snapshot in response to a request from a server that serves as a host connected to the storage device. A request from a server is reported when data in the server is updated. The data slice 203 stores the original data of an update target to be updated by a host. Also, the data slice 203 is a result of backing up data held by a host at a particular moment, and the master slice 204 is a group of pieces of data that is a copy source of snapshot. Respective pieces of data in the master slice 204 according to an embodiment are managed in a chunk size of 4 KB. In the storage device 200 illustrated in FIG. 1, a COW slice used in the COW method is divided into the data slice 203 and the meta slice 202. The meta slice 202 is an area for holding meta information used for snapshot processes such as a header chunk, a meta chunk, or the like. The data slice 203 is a data area for holding update data of snapshot. The meta slice 202 includes mapping information used for making accesses. Mapping information is stored in a cache and is used on an as-needed basis. The control unit 201 refers to mapping information in response to an I/O (Input/Output) request, which is a write request from a host. By referring to mapping information stored in a cache, it is possible to perform processes at higher speeds than in cases where mapping information is referred to from the meta slice, which leads to a higher performance for snapshot. An I/O request includes information of data to be updated, the size of the data to be updated, and the address number of a master slice to which updated data is written. The data slice 203 illustrated in FIG. 1 does not include a slice in middle that causes interruptions, such as a meta slice. Accordingly, the control unit 201 can write slices of the data slice 203 continuously. This make it possible to reduce a seek time used for writing to the data slice 203 and also makes it possible to make I/O requests in an integrated manner.

A storage device of a scale-out type uses the chunk size of 1 MB because of its large volume. However, a large chunk size will lead to a decrease in the copying speed of snapshot. Accordingly, the copying speed can be improved by reducing the chunk size. For example, by reducing the chunk size to 4 KB, the copying speed of snapshot is improved. However, when a chunk size is reduced, the amount of mapping information used for managing chunks increases, making it difficult to keep the mapping information in an on-memory state, which leads to the necessity of employing various methods of caching. Specific values of chunk sizes are examples and do not limit the scope of the invention.

Figure 2:
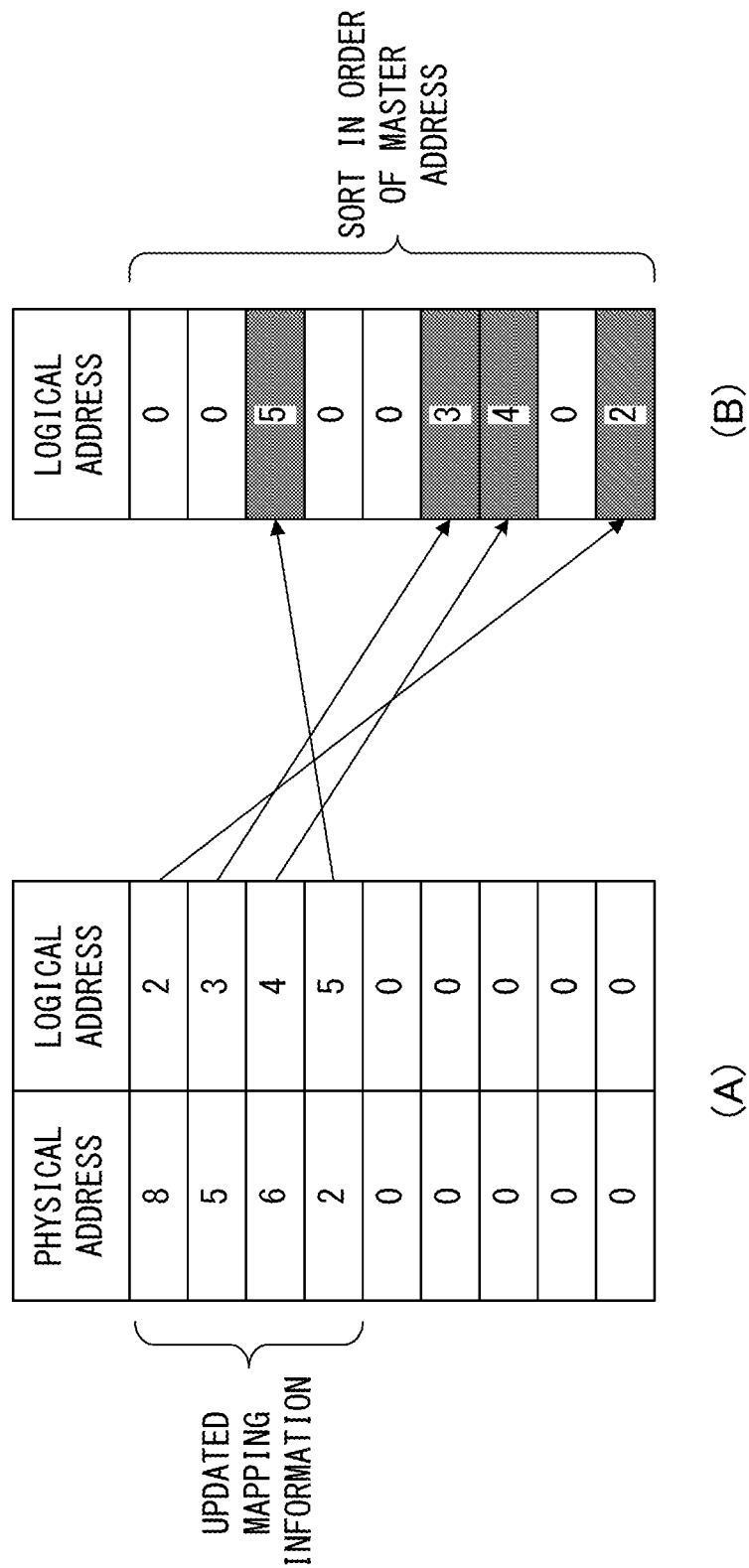
FIG. 2 illustrates an example of mapping information.

FIG. 2 illustrates an example of mapping information. Mapping information is information that associates an address of a master slice and an address of a COW slice. The mapping information in FIG. 2(A) is mapping information used by a storage device that uses a COW method. It is illustrated in the mapping information in FIG. 2(A) that the data at address 8 in the master slice for example is held at address 2 in the COW slice. Note that the addresses in the master slice are physical addresses while the addresses in the COW slice are logical addresses. When there is less mapping information, it is kept in an on-memory state, and high-speed address conversion is possible by using hash search. However, because an increase in mapping information makes it difficult to keep mapping information in an on-memory state, a method in which cache is utilized is employed in the embodiments. In order to increase the amount of information that can be cached, the embodiments employ a configuration that holds only addresses in a COW slice. This configuration facilitates searches for an associated address in a COW slice from an address in a master slice.

The mapping information illustrated in FIG. 2(B) is mapping information according to an embodiment. The example illustrated in FIG. 2(B) illustrates the result of replacing the mapping information in FIG. 2(A) with mapping information according to an embodiment. The pieces of mapping information illustrated in FIG. 2(B) are arranged successively in the order of the addresses in the master slice and hold the address information of the COW slice. Because the addresses in the master slice start with zero, address 2 in the COW slice for example, which is data at address 8 in the master slice, is held at 9. The mapping information according to an embodiment is information that associates an address in the master slice and an address in the data slice, and addresses in the data slice are stored in the order of successively arranging the addresses in the master slice. By generating mapping information as illustrated in FIG. 2(B), the size of data used for mapping information can be reduced. Also, by using pieces of mapping information in the order of addresses in the master slice, times of address conversion from addresses in the master slice into the addresses in the COW slice can be reduced. The control unit 201 reads the mapping information according to an embodiment to a cache so as to use it. Further, by generating a plurality of cache pages, the cache hit rate can be increased, leading to a higher performance for snapshot. Also, the number 0 (zero) stored in the mapping information illustrated in FIG. 2(B) indicates that nothing is assigned. Actual memories are not assigned to an area that stores the number 0. This can reduce a memory area for mapping information. It is desirable to use a thin provisioning mechanism for a meta slice in a storage device so that mapping information that has not been written is not assigned to a memory area.

Figure 3:
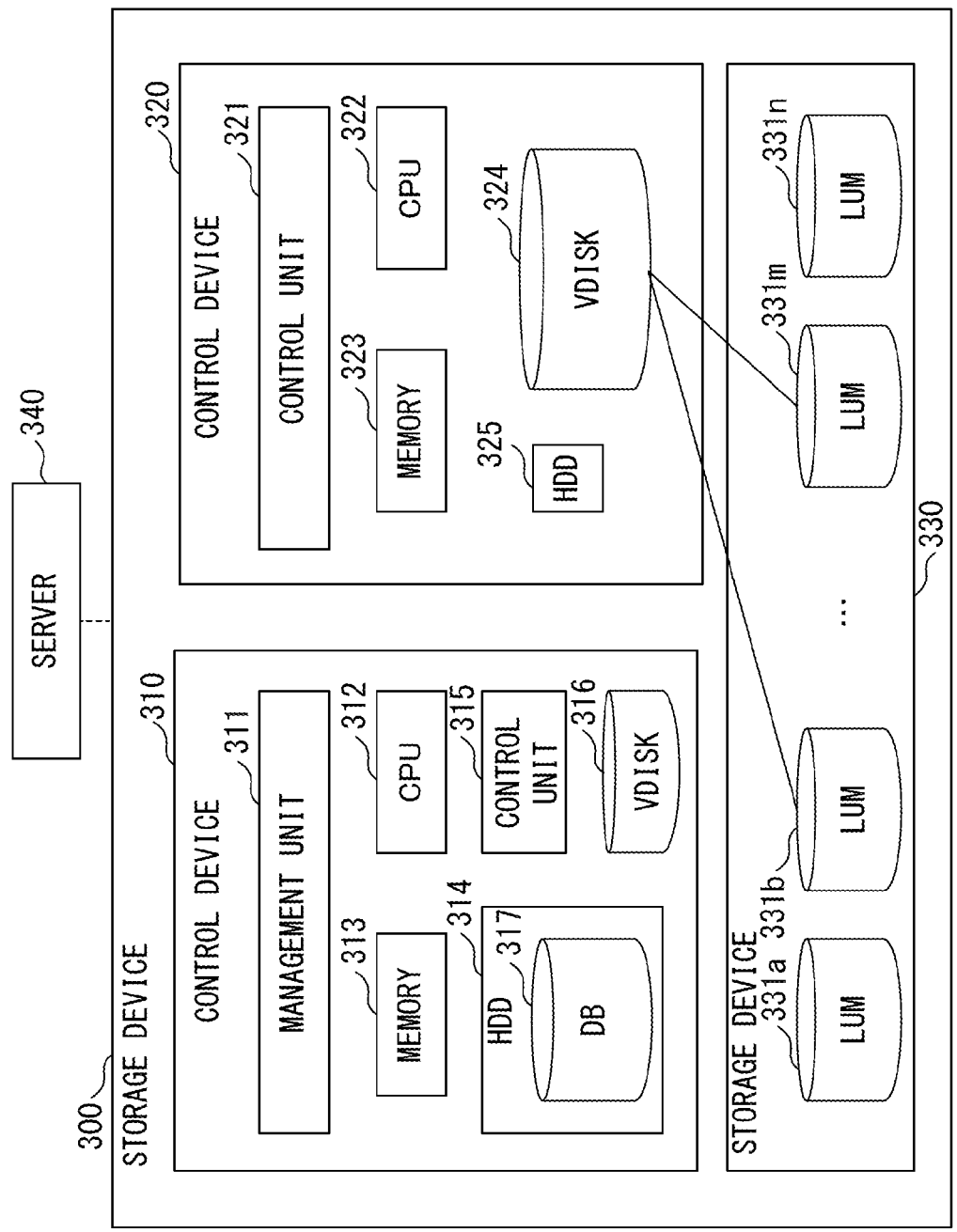
FIG. 3 illustrates an example of a configuration of a storage device.

FIG. 3 illustrates an example of a configuration of a storage device. A storage device 300 is connected to a server 340, and stores data used by the server 340. The storage device 300 includes a control device 310, a control device 320, and a storage device 330. The control device 320 includes a control unit 321, a Central Processing Unit (CPU) 322, a memory 323, a Virtual Disk (VDISK) 324, and a Hard Disk Drive (HDD) 325. A plurality of the control units 321 may be in a storage system. The control unit 321 controls a storage device related to the control device 320, and is an example of the control unit 201 illustrated in FIG. 1. The CPU 322 executes processes of the control unit 321. Various data used by the CPU 322 is stored in the memory 323 and the HDD 325. The VDISK 324 is a virtual storage area obtained by integrating physical storage areas in the storage device 330, and is controlled by the control unit 321. The VDISK 324 includes a meta slice 202, a data slice 203, and a master slice 204. The control device 310 includes a management unit 311, a CPU 312, a memory 313, a HDD 314, a control unit 315, a VDISK 316, and a management database (DATABASE) 317. The control device 310 includes the management unit 311 and the management DB 317 in order to manage the control device 320. The management unit 311 exists in one control device in the storage system, and manages assignment information of hardware of all control devices and information of states by using the management DB 317. The control device 310 is a control device that controls the control device 320. The CPU 312 executes processes of the management unit 311 and the control unit 315. Various data used by the CPU 312 is stored in the memory 313 and the HDD 314. The VDISK 316 is a virtual storage area that uses the storage device 330, and is controlled by the control unit 315. The storage device 330 includes a plurality of hard disks, each of which is identified by a LUN (Logical Unit Number). A LUN is a number for identifying each hard disk. The storage device in FIG. 3 includes LUNs 331a through 331n, and the LUNs 331b through 331m are assigned to the VDISK 324 while the LUNs 331a and 331n are assigned to the VDISK 316. A VDISK uses a thin provisioning mechanism. The control unit 201 illustrated in FIG. 1 may be the control unit 315. Also, the meta slice 202, the data slice 203, and the master slice 204 may be included in the VDISK 316.

Figure 4:
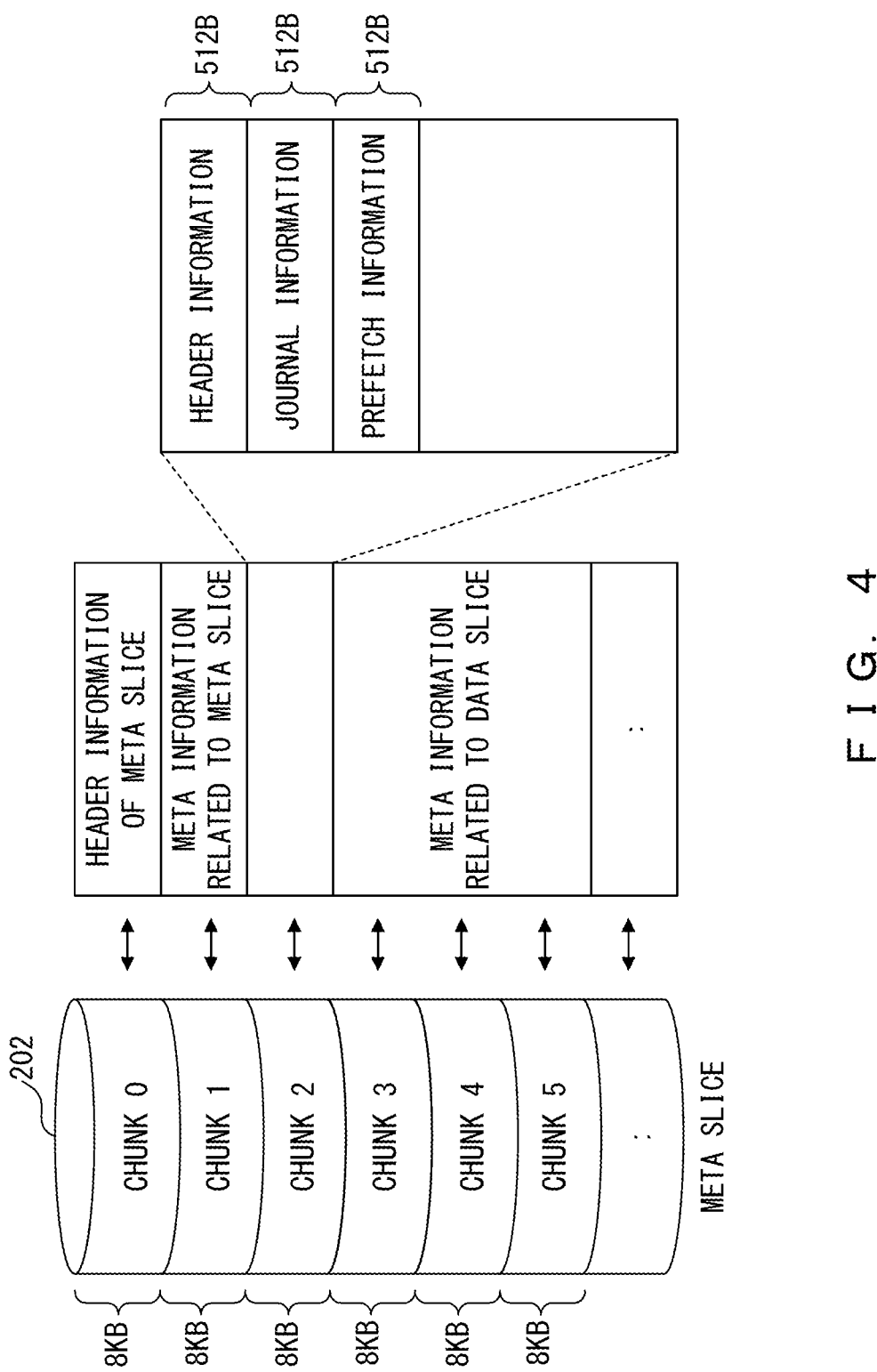
FIG. 4 explains an example of a meta slice in detail.

FIG. 4 illustrates an example of a meta slice in detail. The meta slice 202 is a group of data having a chunk size of 8 KB. A chunk size may be changed and does not limit the size of data. The control unit 201 refers to the meta slice 202 so as to control snapshot. The area of chunk 0 in the meta slice 202 stores header information related to the meta slice. The area of chunk 1 in the meta slice 202 stores mapping information related to the meta slice. The area of chunk 2 in the meta slice 202 stores history information (which will be explained later in FIG. 10) that is used for snapshot and prefetch information (which will be explained later in FIG. 11). Chunk 3 and subsequent chunks in the meta slice 202 store addresses, which are mapping information used in the present embodiment.

<Integration of Requests to Write to Meta Slice>

The control unit 201 receives a write request from the server 340. A write request includes data and meta information used for updating data. The control unit 201 divides a received request into a prescribed size and performs processes. The control unit 201 accesses a data slice and a meta slice in response to respective divisional I/O requests. When, for example, the control unit 201 writes data to successive physical addresses, the writings can be performed efficiently and the number of accesses to the data slice or the meta slice can also be reduced by executing I/O requests in an integrated manner at one time. Accordingly, the storage device according to an embodiment integrates I/O requests to hold the same cache page for I/O requests to a meta slice. Further, the storage device according to an embodiment integrates I/O requests to successive physical addresses for I/O requests to a meta slice.

By integrating I/O requests to hold information of the same cache page and by further integrating I/O requests to successive physical addresses, the control unit 201 can reduce the number of accesses to a cache. The occurrence of a process of determining the address of each access is one cause of a time taken for a snapshot process. In a method according to the present embodiment, a plurality of I/O requests related to the same cache page are integrated into one I/O request, and further it is possible to improve the snapshot performance because they are integrated into an I/O request to successive physical addresses. Also, because an I/O request includes additional information of the size of data to be written, the address number of a master slice to which data is to be written, information related to a cache page, and the like, the control unit performs integration by using these pieces of information.

Figure 5A:
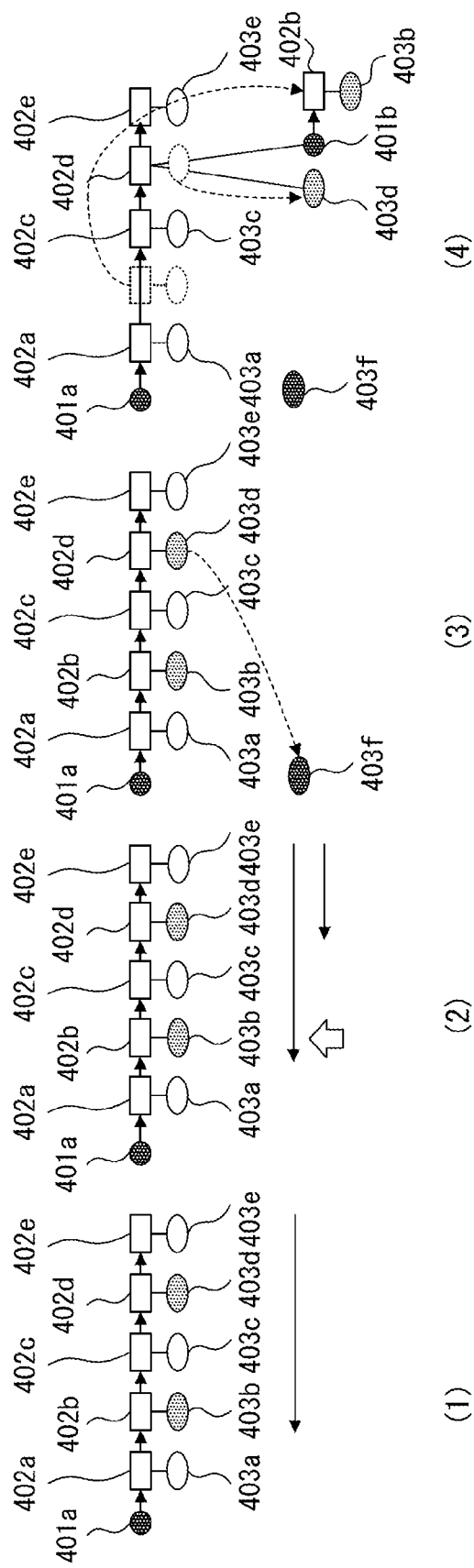
FIG. 5A illustrates an example of the integration of write requests to hold the same cache page.
Figure 5B:
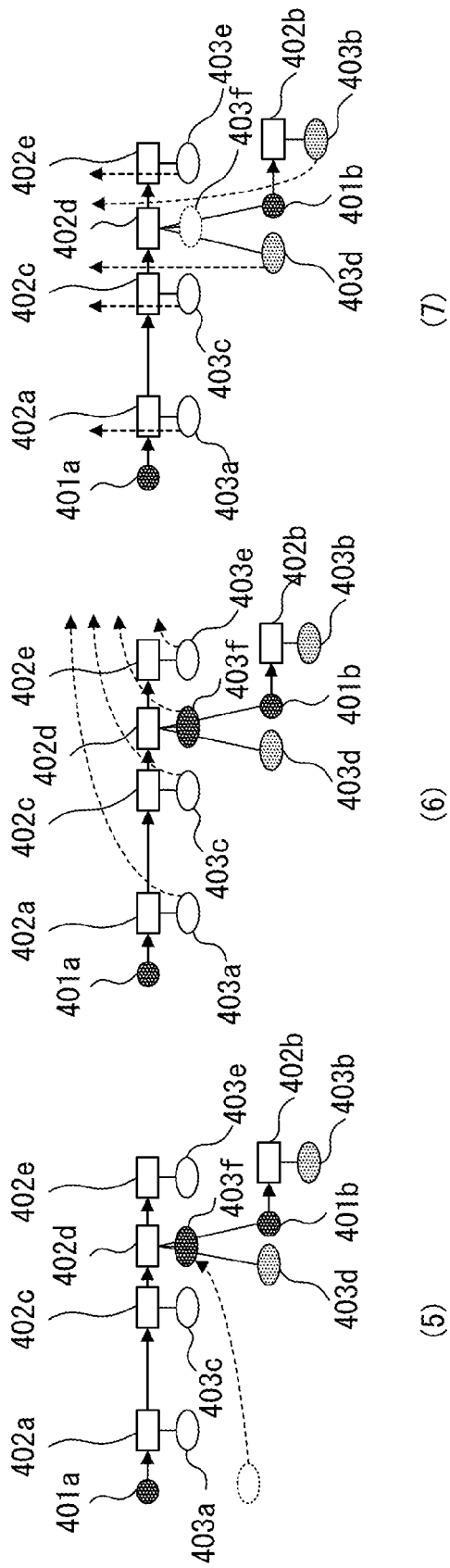
FIG. 5B illustrates an example of the integration of write requests to hold the same cache page.

FIG. 5 illustrates an example of the integration of write requests to hold the same cache page. FIG. 5 illustrates an example of the integration of write requests by using FIG. 5A(1) through FIG. 5B(7). The example in FIG. 5 will be explained by using queues 401a through queues 401b, jobs 402a through 402e, and pieces of additional information 403a through 403f. The queue 401a processes jobs sequentially in the order of the jobs 402a, 402b, . . . , 402e. Jobs and additional information associated with jobs are I/O requests divided by the control unit. In FIG. 5A(1), the situation is that in which the jobs 402a through 402e are waiting for a process of the queue 401a. The jobs 402a through 402e have the pieces of additional information 403a through 403e that correspond to the jobs 402a through 402e, respectively. In the example illustrated in FIG. 5, the additional information 403b and the additional information 403d have information of the same cache page.

FIG. 5A(1): The control unit 201 checks additional information associated with each job in the order from the job 402e, which is the last job among jobs waiting for a process of the queue 401a.

FIG. 5A(2): The control unit 201 finds a job that has information of the same cache page. In the example illustrated in FIG. 5, the additional information 403b and the additional information 403d have information of the same cache page.

FIG. 5A(3): The control unit 201 generates additional information dedicated to jobs having information of the same cache page. In FIG. 5 A(3), the additional information 403f, dedicated to the additional information 403d, is generated.

FIG. 5A(4): The control unit 201 performs setting so that when a subsequent job having information of the same cache page is executed, the first job having information of the same cache page is executed parallelly. In FIG. 5A(4), the job 402b is assigned to the queue 401b. The additional information 403d is stored in a prescribed queue.

FIG. 5B(5): The control unit 201 sets the additional information 403f as the additional information of the job 402d.

FIG. 5B(6): The control unit 201 executes unsynchronized I/O.

FIG. 5B(7): The control unit 201 collects pieces of additional information of respective terminated jobs. Also, the additional information 403f generated in FIG. 5A(3) is discarded.

Figure 6A:
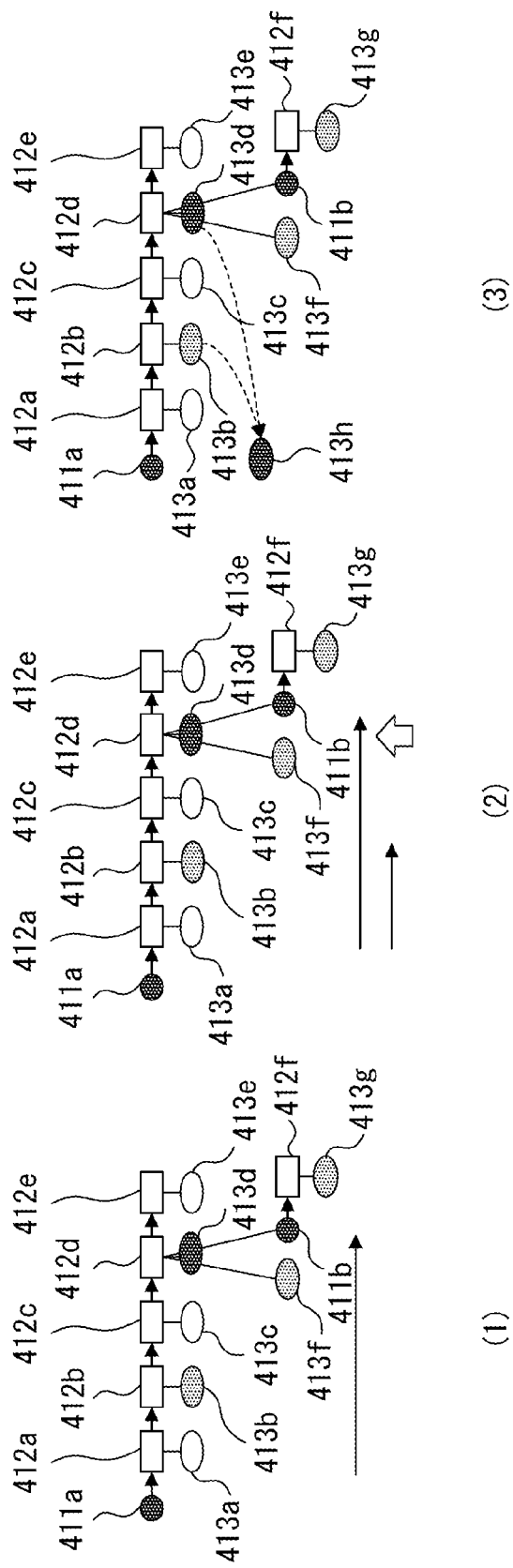
FIG. 6A illustrates an example of the integration of write requests to hold successive physical addresses.
Figure 6C:
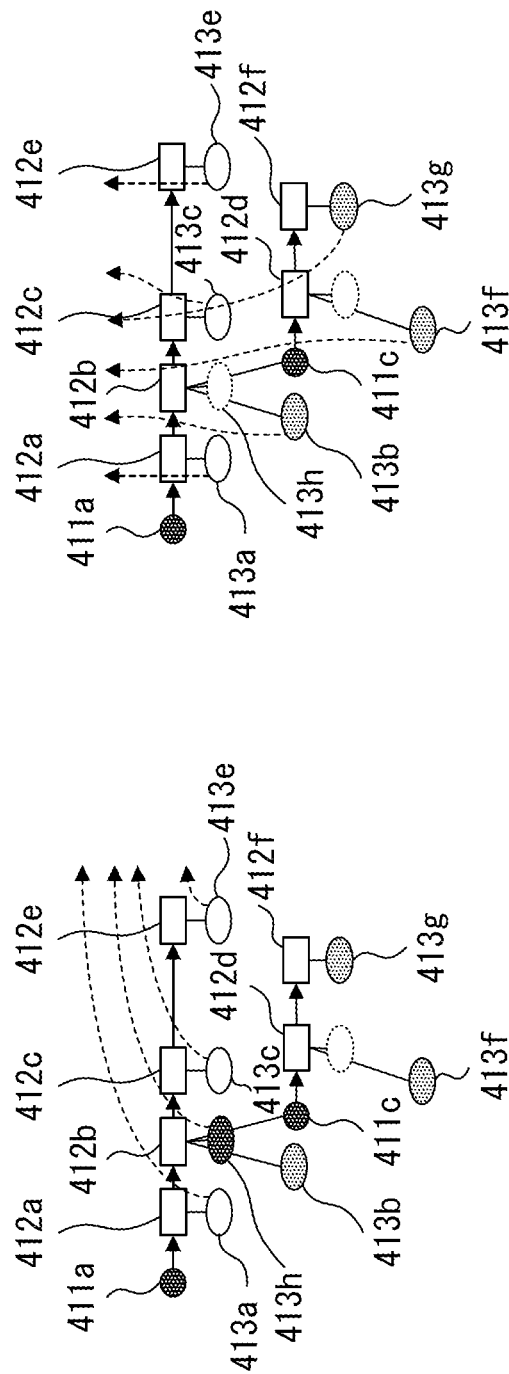
FIG. 6C illustrates an example of the integration of write requests to hold successive physical addresses.

FIG. 6 illustrates an example of the integration of write requests to hold successive physical addresses. FIG. 6 illustrates an example of the integration of write requests to successive physical addresses by using FIG. 6A(1) through FIG. 6C(9). The example in FIG. 6 will be explained by using queues 411a through 411c, jobs 412a through 412f, and pieces of additional information 413a through 413h. The queue 411a processes jobs sequentially in the order of the jobs 412a, . . . , 412e. Jobs and additional information associated with the jobs are I/O requests divided by the control unit. The process of integrating write requests to successive physical addresses in FIG. 6 are executed parallelly to the process of integrating write requests to hold the same cache page illustrated in FIG. 5. By processing I/O requests to successive physical addresses in an integrated manner, the control unit 201 can reduce the number of accesses to a cache, improving the snapshot performance. FIG. 6A(1) illustrates an example after the process illustrated in FIG. 5B(5). In FIG. 6A(1), the jobs 412a through 412e are waiting for the process of the queue 411a. The job 412f is set to be executed by the queue 411b parallelly to the process of the job 412d. The additional information 413d is an example of additional information generated in FIG. 5A(3). The additional information 413f is additional information stored in a prescribed queue. The jobs 412a through 412e have pieces of additional information corresponding to the jobs 412a through 412e, respectively. In the example illustrated in FIG. 6, the additional information 413b and the additional information 413f have information of successive physical addresses.

FIG. 6A(1): The control unit 201 checks additional information associated with each job in the order from the job 412a, which is the first job among jobs waiting for a process of the queue 411a.

FIG. 6A(2): The control unit 201 finds a job that has information of successive physical addresses. In the example illustrated in FIG. 6, the additional information 413b and the additional information 413f have information of successive physical addresses.

FIG. 6A(3): The control unit 201 generates additional information dedicated to jobs having information of successive physical addresses. In FIG. 6A(3), the additional information 413h, dedicated to the additional information 413b and the additional information 413d, is generated.

FIG. 6B(4): The control unit 201 performs setting so that when the first job having information of successive physical addresses is executed, a subsequent job having information of successive physical addresses is executed parallelly. In FIG. 6A(4), the job 412d is assigned to the queue 411c. The additional information 413b is stored in a prescribed queue.

FIG. 6B(5): The control unit 201 deletes the additional information 413d of the job 412d, and sets the job 412f as a job subsequent to the job 412d.

FIG. 6B(6): The control unit 201 sets the additional information 413h as additional information of the job 412b.

FIG. 6C(7): The control unit 201 executes unsynchronized I/O.

FIG. 5C(8): The control unit 201 collects pieces of additional information of respective terminated jobs. Also, the additional information 413f is discarded.

The control unit 201 may execute one of the process of integrating jobs having the same cache page and the process of integrating jobs having information of successive physical addresses, and may also execute both of them.

<Method of Writing Snapshot>

Figure 7A:
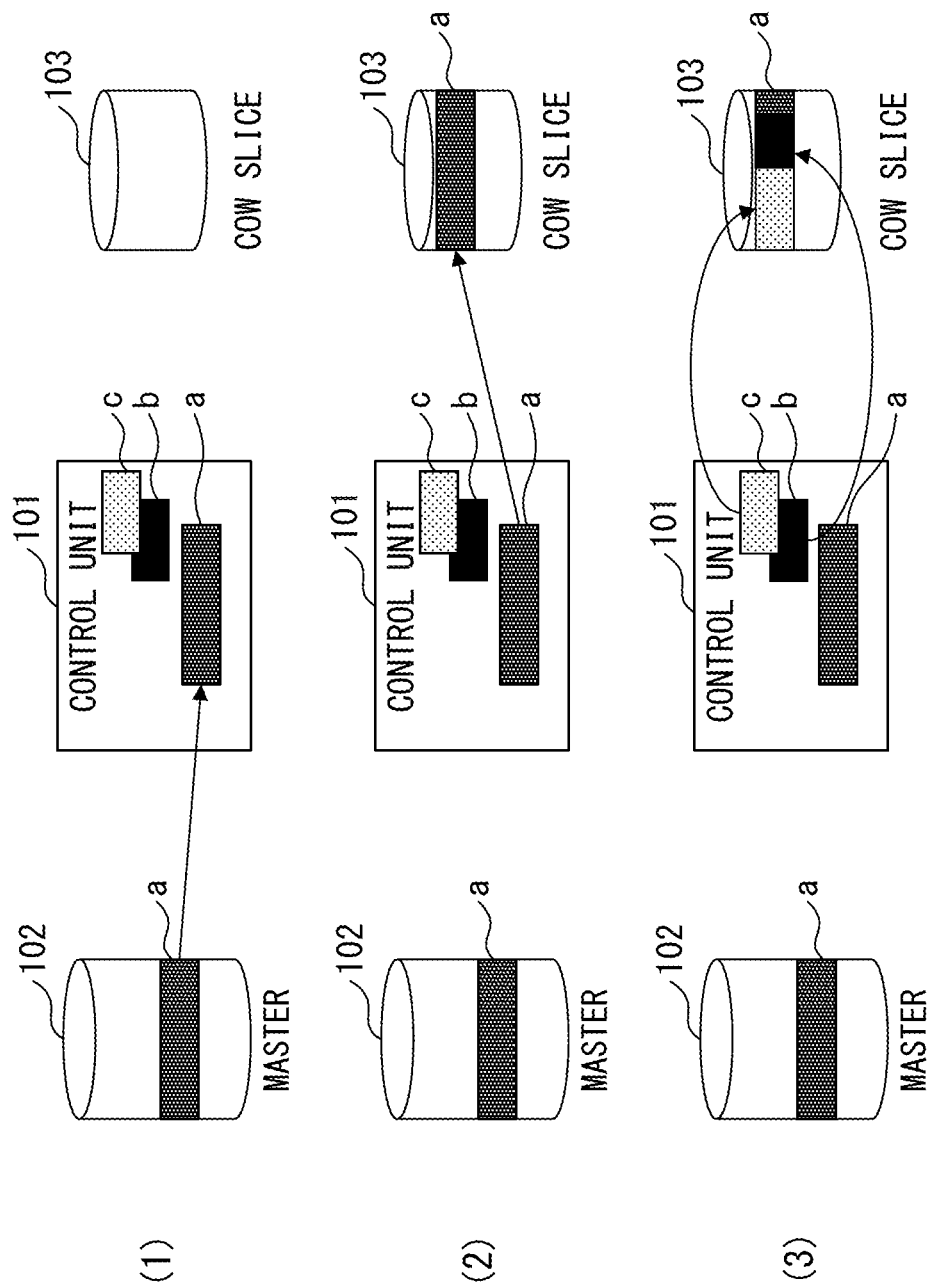
FIG. 7A illustrates an example of a process of snapshot.

FIG. 7 illustrate an example of a process of snapshot. FIG. 7A illustrates an example of a process of snapshot of the COW method. FIG. 7 illustrate an example of a case where a request has been made by the server to write data b and data c. In this example, data b and data c are data for updating the chunk of data a in a master slice 102. A process of snapshot of the COW method will be explained by using (1) through (3) in FIG. 7A. FIG. 7A includes a control unit 101, a master slice 102, and a COW slice 103. As exemplified in (1) of FIG. 7A, when the server has made a write request, the control unit 101 stores, in a memory, data b and data c for updating. The control unit 101 reads, from the master slice 102, data a, which is a data chunk of the target to which data b and data c are to be written. The control unit 101 stores data a in a memory. In (2) in FIG. 7A, the control unit 101 writes read data a to the COW slice 103. In (3) in FIG. 7A, the control unit 101 writes data b and data c on data a in the COW slice so as to generate data a'.

Figure 7B:
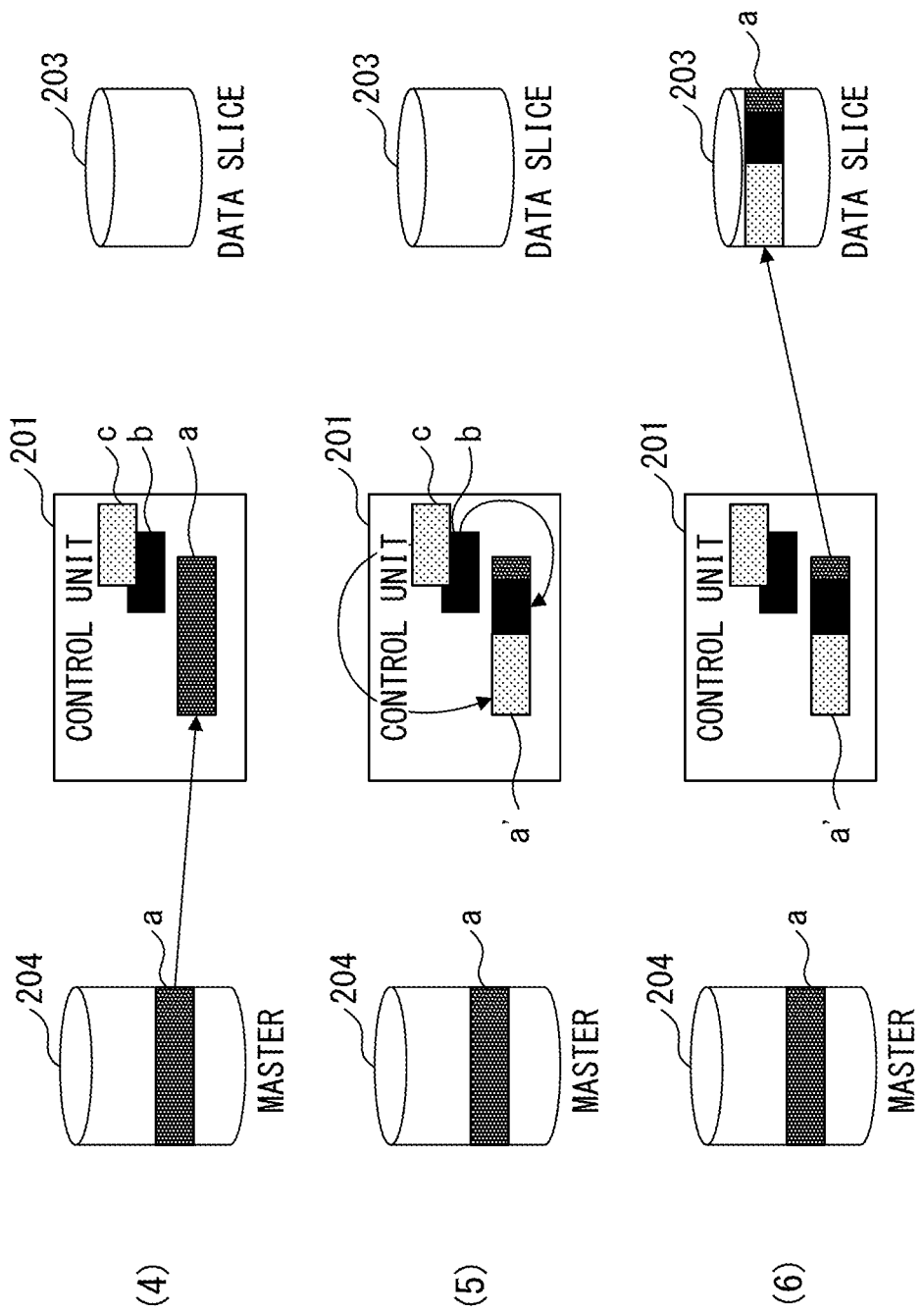
FIG. 7B illustrates an example of a process of snapshot.

FIG. 7B illustrates an example of a process of snapshot according to an embodiment. In FIG. 7B, constituents similar to those in FIG. 1 are denoted by similar numbers. A process of snapshot according to an embodiment will be explained by using (4) through (6) in FIG. 7B. As exemplified in (4) in FIG. 7B, when a write request has been made by a server, the control unit 201 stores data b and data c in a memory. The control unit 201 reads, from the master slice 204, data a, to which data b and data c are to be written. The control unit 201 stores data a in a memory. In (5) in FIG. 7B, the control unit 201 writes data b and data c on data a so as to generate data a'. In (6) in FIG. 7B, the control unit 201 writes data a' to the data slice 203. In the snapshot in FIG. 7A, an I/O request of writing to a COW slice occurs three times, i.e., writing of data a, writing of data b, and writing of data c. In the snapshot in FIG. 7B, an I/O request of writing to a data slice occurs once, i.e., the writing of data a'. Accordingly, by performing writing in a method of the snapshot illustrated in FIG. 7B, the number of accesses to the data slice is reduced, increasing the processing speed of snapshot.

<Reduction of Read Processes Performed by Control Unit>

Figure 8:
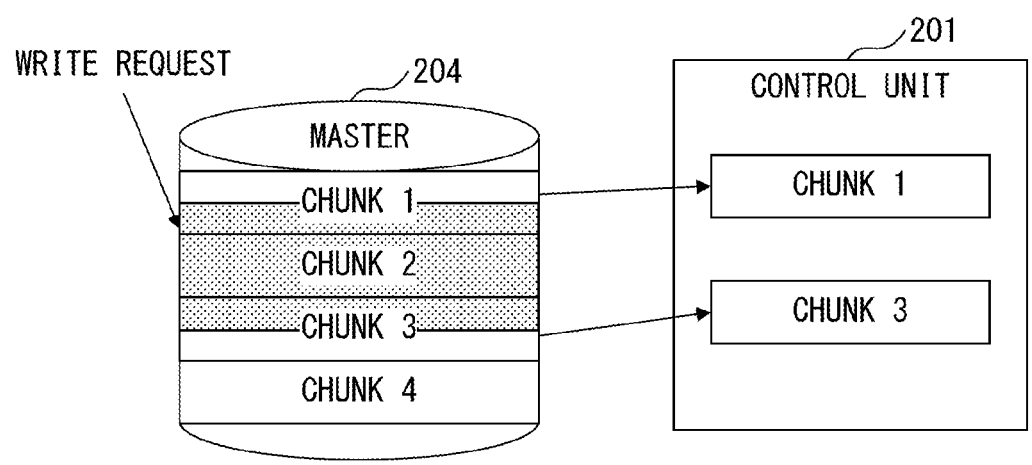
FIG. 8 illustrates an example of a process related to a write request of data across a plurality of chunks.

FIG. 8 illustrates an example of a process related to a write request of data across a plurality of chunks. FIG. 8 illustrates an example of a case where there is a write request to data across chunks 1 through 3. Write requests to chunks 1 and 3 are requests to update part of the data of chunks 1 and 3. A write request to chunk 2 is a request to update the entire data of chunk 2. In the method of the snapshot illustrated in FIG. 7B, the control unit reads the data of chunk 1 through chunk 3 from the master slice. Next, the control unit writes the data of chunks 1 through 3 to the COW slice. Thereafter, the control unit writes the data for updating over the data of chunks 1 through 3 that was written to the COW slice.

In snapshot according to an embodiment, the control unit 201 does not read data of a chunk in which data is updated entirely. In this example, the control unit 201 does not read data in chunk 2. Data in chunk 2 is updated entirely when the control unit 201 updates the data. Accordingly, it is not necessary for the control unit 201 to perform a process of reading the data in chunk 2. By avoiding a reading process on a chunk in which data is updated entirely as above, unnecessary reading processes can be reduced, leading to a higher performance for snapshot.

<Integration of Write Requests to Data Slice>

When the control unit 201 has received a write request from the server 340, it divides the received request into a prescribed size, and performs a process. The control unit 201 accesses a data slice in accordance with the respective divisional I/O requests. When, for example, the control unit 201 writes data to successive physical addresses, this process will be performed more efficiently and the number of accesses to a data slice can be reduced by executing all I/O requests at one time in an integrated manner. Accordingly, the storage device according to an embodiment processes I/O requests to successive physical addresses in an integrated manner for I/O requests to a data slice. By integrating I/O requests to successive physical addresses, the control unit 201 can reduce the number of accesses to a cache, leading to a higher performance for snapshot. Also, because an I/O request includes additional information on the size of data to be written, the address number of a master slice to which data is to be written, information related to a cache page, and the like, the control unit performs integration by using these pieces of information.

Figure 9A:
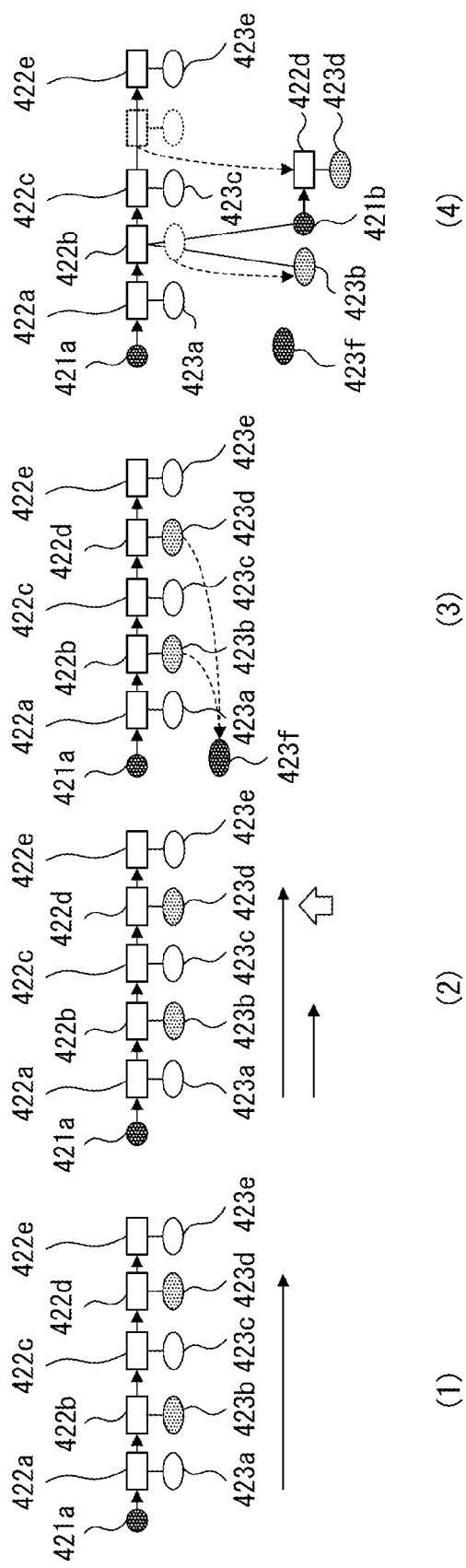
FIG. 9A explains an example of integrating write requests to a data slice.
Figure 9B:
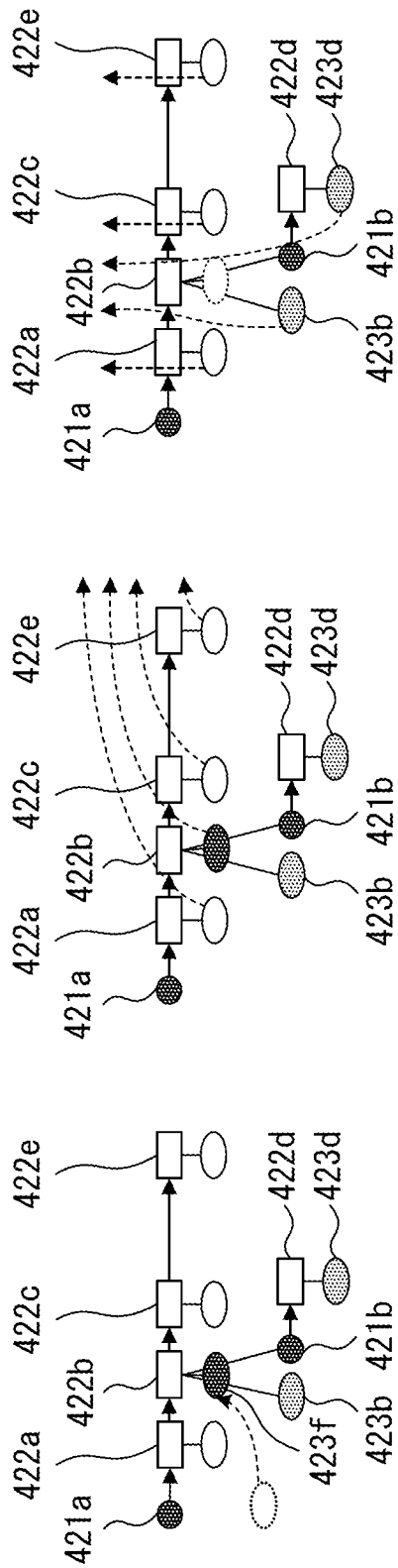
FIG. 9B explains an example of integrating write requests to a data slice.

FIG. 9 illustrate examples of processes of integrating requests to write data to a data slice. FIG. 9 illustrates examples of integration of write requests to a data slice by using FIG. 9A(1) through FIG. 9B(7). The examples in FIG. 9 will be explained by using queues 421a through 421b, jobs 422a through 422e, and additional information 413a through 413f. The queue 421a processes jobs sequentially in the order of the jobs 422a, . . . , 422e. Jobs and additional information associated with the jobs are I/O requests divided by the control unit. By processing data to be written to successive physical address in an integrated manner, the control unit 201 can reduce the number of accesses to a cache, leading to a higher performance for snapshot. In FIG. 9A(1), the jobs 422a through 422e are waiting for the process of the queue 421a. The jobs 422a through 422e include pieces of additional information 423a through 423e corresponding to the jobs 422a through 422e, respectively. In the example illustrated in FIG. 9, the additional information 423b and the additional information 423d have information of the address of the same master slice.

FIG. 9A(1): The control unit 201 checks additional information associated with each job in the order from the job 422a, which is the first job among jobs waiting for a process of the queue 421a.

FIG. 9A(2): The control unit 201 finds a job that has information of the same master slice. In the example illustrated in FIG. 5(2), the additional information 423b and the additional information 423d have information of the address number of the same master slice.

FIG. 9A(3): The control unit 201 generates additional information dedicated to jobs having information of the address of the same master slice. In FIG. 9(3), the additional information 423f, dedicated to the additional information 423b and the additional information 423d, is generated.

FIG. 9A(4): The control unit 201 performs setting so that when the first job having information of the address of the same master slice is executed, a subsequent job is executed parallelly. In FIG. 9(4), the job 422d is assigned to the queue 421b. The additional information 423b is stored in a different queue as additional information whose process has been terminated.

FIG. 9B(5): The control unit 201 sets the additional information 423f as additional information of the job 422b.

FIG. 9B(6): The control unit 201 executes unsynchronized I/O.

FIG. 9B(7): The control unit 201 collects pieces of additional information of respective terminated jobs. Also, the additional information generated in FIG. 9(3) is discarded.

<Regarding Down Recovery>

The meta slice 202 according to an embodiment stores history information, which is information representing a proceeding level of a data writing process, i.e., information representing which of the addresses in a data slice the data writing process has proceeded to. History information further stores information representing a proceeding level of a process of writing data to a meta slice. When a writing process to a data slice has been terminated and thereafter a writing process to a meta slice is to be started, the control unit 201 updates history information. When a failure has occurred while the control unit 201 is updating history information, preventing the history update, there is a possibility that the history information and the actual state will not correspond. It is desirable that history information be able to be recovered even when a failure has occurred. Also, history information is updated also when the control unit 201 is halted.

Figure 10A:
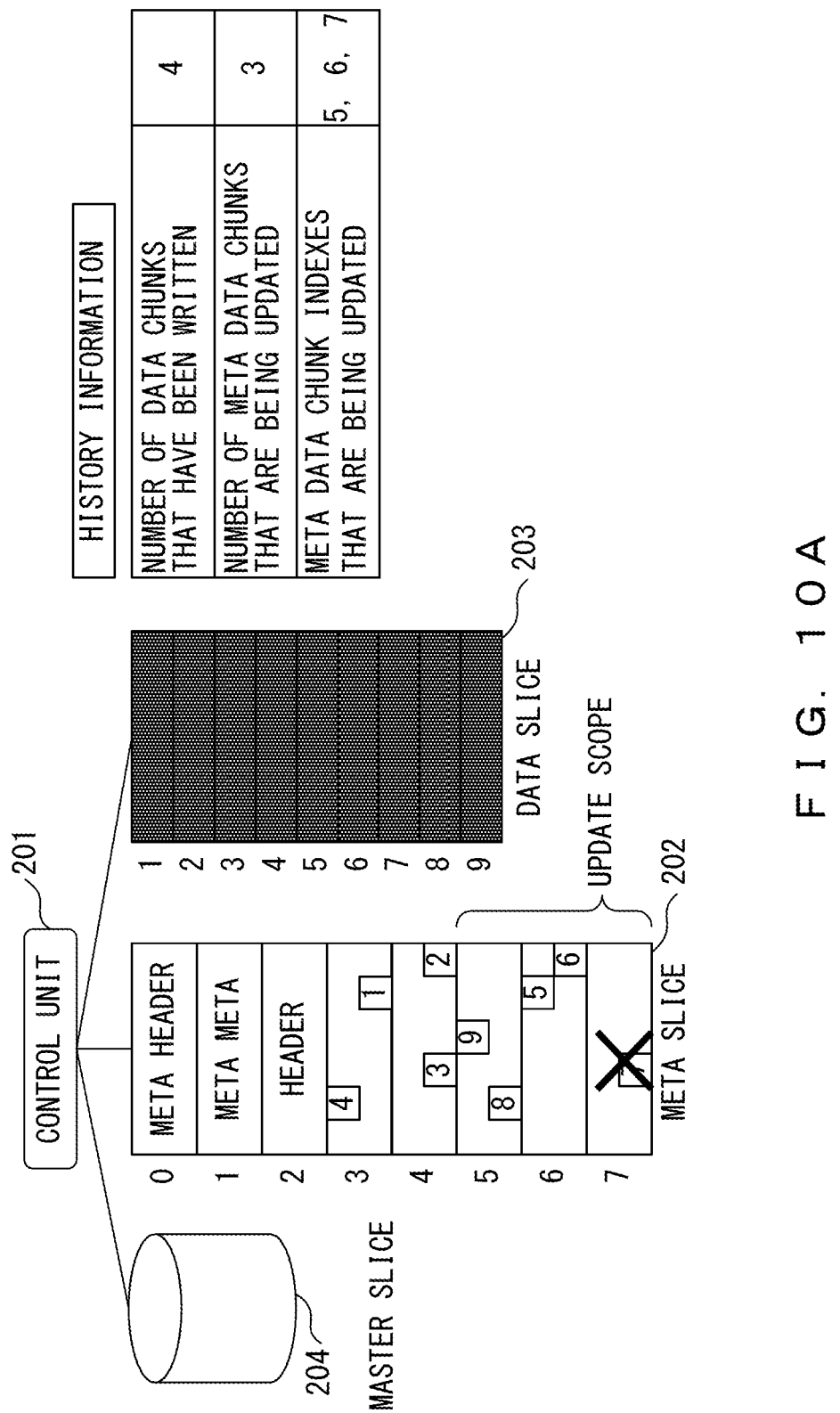
FIG. 10A illustrate an example of down recovery of history information.

FIG. 10 illustrate an example of down recovery of history information. In FIG. 10, elements similar to those in FIG. 1 are denoted by the same numbers. FIG. 10 illustrate an example in which writing of meta information for data 7 to a meta slice has failed because of a failure despite the fact that the control unit 201 has already written data 1 through data 9 to the data slice. Note that the writing of meta information of data 1 through data 6 and data 8 and data 9 to the meta slice 202 has succeeded. FIG. 10(A) illustrates an example of a storage device when the control unit 201 has been activated after the occurrence of a failure. The data slice 203 in FIG. 10(A) has stored data 1 through data 9. The meta slice 202 in FIG. 10(A) has stored meta information of data 1 through data 6 and data 8 and data 9. In the area specified by address 3 in the meta slice 202, meta information of data 1 and data 4 has been stored. In the area specified by address 4 in the meta slice 202, meta information of data 2 and data 3 has been stored. In the area specified by address 5 in the meta slice 202, meta information of data 8 and data 9 has been stored. In the area specified by address 6 in the meta slice 202, meta information of data 5 and data 6 has been stored. The area specified by address 7 in the meta slice 202 is an area for storing meta information of data 7.

History information includes the number of data chunks that have already been written to a data slice, the number of meta chunks that are being updated to a meta slice, and address information of meta chunks that are being updated to a meta slice. The number of data chunks that have already been written to a data slice in history information is information representing a proceeding level of a data writing process to a data slice. The number of meta chunks that are being updated to a meta slice in history information and address information of meta chunks that are being updated into a meta slice are information representing a proceeding level of a writing process to a meta slice. The example of history information illustrated in FIG. 10(a) illustrates a case where the number of data chunks that have already been written to a data slice is four, the number of meta chunks that are being updated to a meta slice is three, and the address information of meta chunks that are being updated to a meta slice holds 5, 6, and 7. In the data slice 203, despite the fact that the writing of data 1 through 9 has succeeded, the number of data chunks that have already been written is four, resulting in a non-correspondence between history information and the actual status. Accordingly, the control unit 201 recovers the history information. Also, when the control unit 201 of a storage device has been halted normally, zero is stored as the number of meta chunks that are being updated. Accordingly, the control unit 201 performs recovery when the number of meta chunks being updated in history information obtained upon the activation is not zero.

Figure 10B:
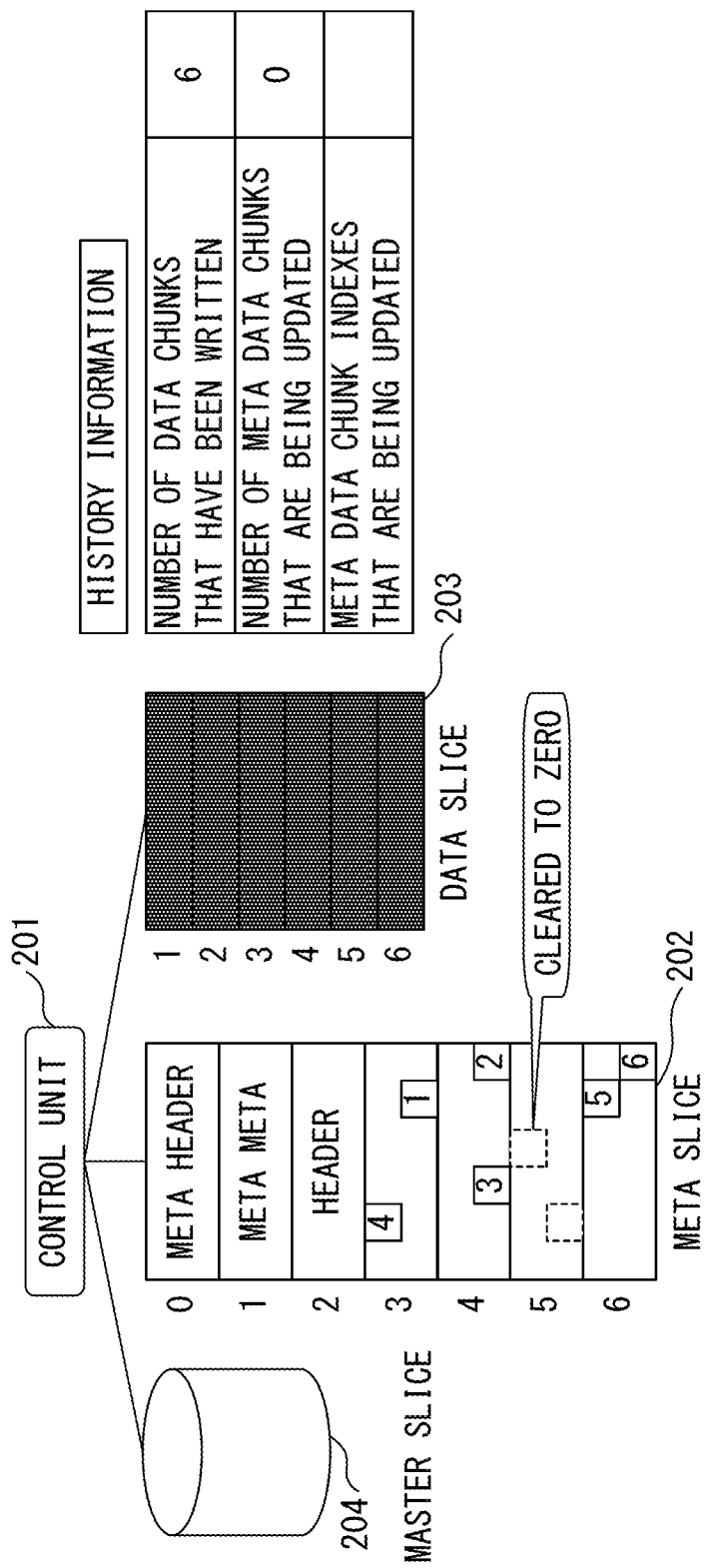
FIG. 10B illustrate an example of down recovery of history information.

The control unit 201 lists pieces of meta information of data that has been written to a data slice successfully. At this moment, history information indicates that data 1 through data 4 have been written to a data slice successfully. Accordingly, information included in history information is not included in the list. The control unit 201 determines that pieces of data that have been written to a data slice successfully are data 5, data 6, data 8, and data 9. The control unit 201 searches a meta slice for data for which the writing to the meta slice has failed because of a failure, by using the address information of meta chunks that are being updated to a meta slice. The control unit 201 determines that data 5 and data 6, which were written before the data for which writing failed, are pieces of data that have been written successfully. The control unit 201 writes in the history information that pieces of data up to data 6 have been processed normally. FIG. 10(B) illustrates an example of a storage device after history information is recovered. The control unit 201 has changed the number of data chunks that have already been written in the history information to six. By contrast, the control unit 201 does not determine that data 8 and data 9, which are written later than data 7, have been written normally, and determines them to be invalid data. Accordingly, meta information related to data 8 and data 9 are deleted from the meta slice 202. The control unit 201 restarts backup from data for which writing failed.

<Prefetch of Meta Data>

FIG. 11 illustrates an example of prefetch of meta data. In the present embodiment, a higher performance for snapshot is expected by treating part of mapping information in a cache. However, mapping information that uses a cache doest not cause effects on the performance of snapshot except for a case when there is a cache hit. In a sequential access, a plurality of pieces of mapping information are obtained. A process of reading mapping information of a meta slice onto a cache has to be executed for each writing request to a data slice until cache hits are detected for all successive pieces of mapping information. An increase in writing processes and reading processes deteriorates the performance of snapshot. By prefetching mapping information has a high possibility of being referred to in the cache of meta information, the rate of cache hits is increased, and the performance deterioration of snapshot is moderated.

The control unit 201 includes at least as many physical addresses as a threshold specifies, and determines that data obtained by integrating I/O requests to successive physical addresses is a sequential access. Data obtained by integrating I/O requests to successive physical addresses includes information related to a cache page used by the control unit. The control unit determines whether or not a cache has information of the cache page that is expected to be used. When the cache does not have the information of the cache page expected to be used, the control unit performs prefetch, in which the cache page is read to a cache first. In FIG. 11, elements similar to those in FIG. 1 are denoted by the same numbers. The storage device illustrated in FIG. 11 includes a cache area 210 from which the meta slice 202 reads data. The master slice 204 is a group of pieces of data including chunk 0 through chunk n, and FIG. 11 illustrates an example of a case where sequential accesses are made to chunk 0 through chunk 8. The mapping information included in the meta slice 202 illustrated in FIG. 11 includes cache pages 00 through 08. Data in chunks 0 through 5 used by the sequential accesses use cache page 04, and data in chunks 6 through 8 are assumed to use cache page 05. The cache area 210 illustrated in FIG. 11 is assumed to hold cache pages 02 through 04. When sequential accesses are made to chunks 0 through 5, the control unit 201 performs prefetch of reading beforehand, onto the cache area 210, cache page 05, which is expected to be used next. By performing prefetch, it is possible to read, onto a cache area, information having a high possibility of being referred to next in the cache area 210, improving the cache hit rate and enhancing the performance of snapshot. It is also possible to obtain statistical information of accesses so as to delete cache pages that are used less frequently for a cache page in a cache area.

FIG. 12 is a flowchart that explains an example of a process performed by the control unit that has received an I/O request. The control unit 201 receives an I/O request from the server (step S101). The control unit 201 determines whether or not the data size of the I/O request received from the server is equal to or greater than a threshold (step S102). The control unit 201 divides the I/O request (step S103 and YES in step S 102). The control unit 201 determines whether or not data to be written by a divisional I/O request is being used currently (step S104, NO after the process in S103 and S102). The control unit 201 sets a divisional I/O request as a subsequent queue (step S106). When the process in step S 106 is terminated, the control unit 201 makes the process return to S104. The control unit 201 refers to the mapping information (step S105, and NO in step S 104). Step S 105 will be described in detail in the flowchart illustrated in FIG. 13.

Figure 13:
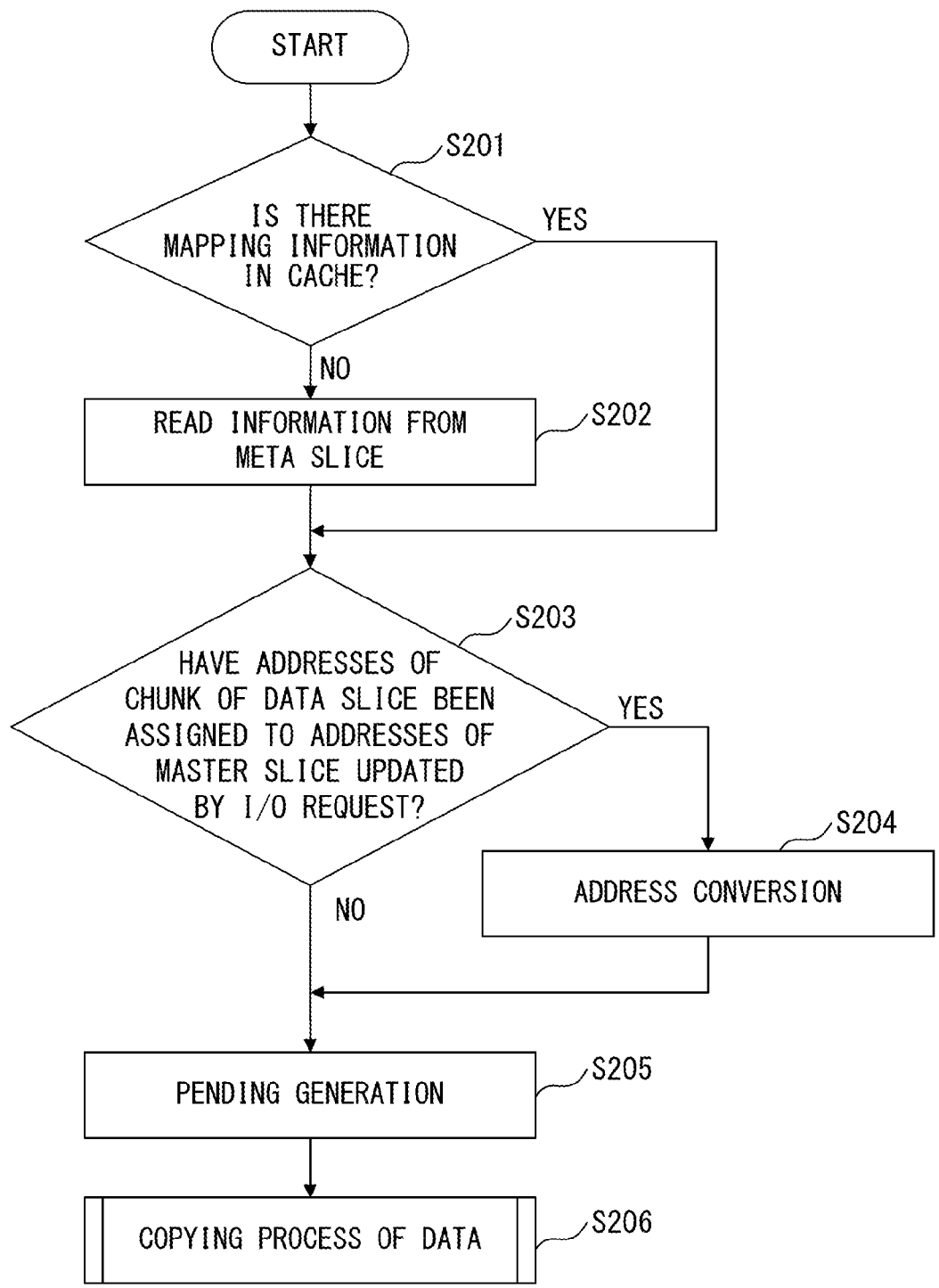
FIG. 13 is a flowchart explaining an example in which the control unit refers to mapping information.

FIG. 13 is a flowchart explaining an example in which the control unit refers to the mapping information. The control unit 201 determines whether or not the address of the master slice to which the I/O request writes data is included in a cache (step S201). The control unit 201 reads the mapping information onto the cache area from the meta slice (step S202 and NO in step S 201). The control unit 201 determines whether or not addresses of a chunk of the data slice have been assigned to the addresses of the master slice that is to be updated by the I/O request (step S203 and YES after step S 202 or in step S 201). The control unit 201 converts the address of the master slice of the I/O request into the address of the chunk of the data slice (step S204 and YES in step S 203). The control unit 201 treats, as "being used", the addresses of the master slice to be used as the I/O request (step S205). The control unit 201 performs processes related to copying of data (step S206). Step S 206 will be described in detail in the flowchart illustrated in FIG. 14.

FIG. 14 is a flowchart that explains an example of a process related to copying of data. The control unit 201 determines whether or not the data to be updated by the I/O request is a partial copy in each chunk (step S301). The process in step S301 corresponds to the explanations in FIG. 8. Chunks that are determined to be NO in step S301 are chunks whose entire data is an update target as represented by chunk 2 in FIG. 8, and it is not necessary to copy chunk 2 onto the control unit 201. Meanwhile, partial copies are chunks 1 and 3 in FIG. 8, and the chunks are copied onto the control unit 201. The control unit 201 reads the chunks onto the control unit 201 (step S302 and YES in step S301). The control unit 201 integrates I/O requests obtained in the dividing in step S 103 illustrated in FIG. 12 (step S303 and NO in step S301). The integration process in step S303 is the processes explained in FIG. 5, FIG. 6, and FIG. 9. The control unit 201 updates the update data in the I/O request in the control unit, and writes the updated data to the data slice 203 (step S304). The control unit 201 performs a writing process of mapping information (step S305). The writing process of mapping information will be explained in detail in FIG. 15.

FIG. 15 is a flowchart that explains a process in which the control unit writes meta data to the meta slice. The control unit 201 writes history information and information related to prefetch to the meta slice 202 (step S401). The control unit 201 writes the mapping information to the meta slice 202 (step S402). When the process in step S 402 is terminated, the control unit 201 terminates the process.

Figure 16:
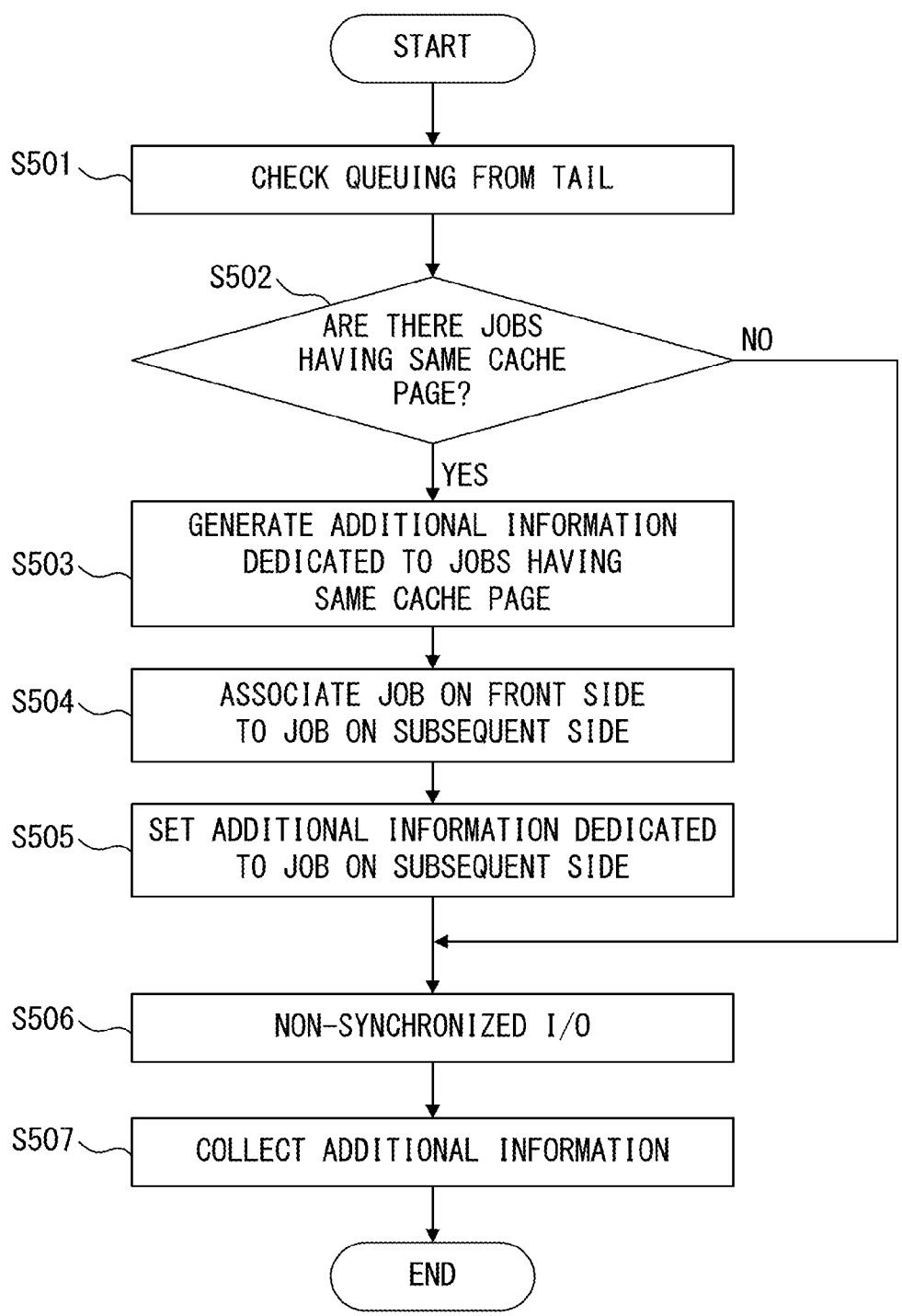
FIG. 16 illustrates a flowchart explaining an example of integrating write requests to hold the same cache page.

FIG. 16 illustrates a flowchart explaining an example of integrating write requests to hold the same cache page. The control unit 201 checks additional information of jobs that have been queued starting from the job queued at the tail (step S501). The control unit 201 determines whether or not there are jobs having the same cache page (step S502). The control unit 201 generates additional information dedicated to jobs that have been queued on the subsequent side from among jobs having the same cache page (step S503 and YES in step S502). The control unit 201 performs setting so that jobs that have been queued on the prior side are executed when jobs that have been queued on the subsequent side among jobs having the same cache page are executed (step S504). The control unit 201 sets the dedicated additional information to jobs that have been queued on the subsequent side (step S505). The control unit 201 executes non-synchronized I/O (step S506 and NO in step S502). The control unit 201 collects additional information of all jobs (step S507). The control unit 201 terminates the process of integrating write requests to hold the same cache page.

Figure 17:
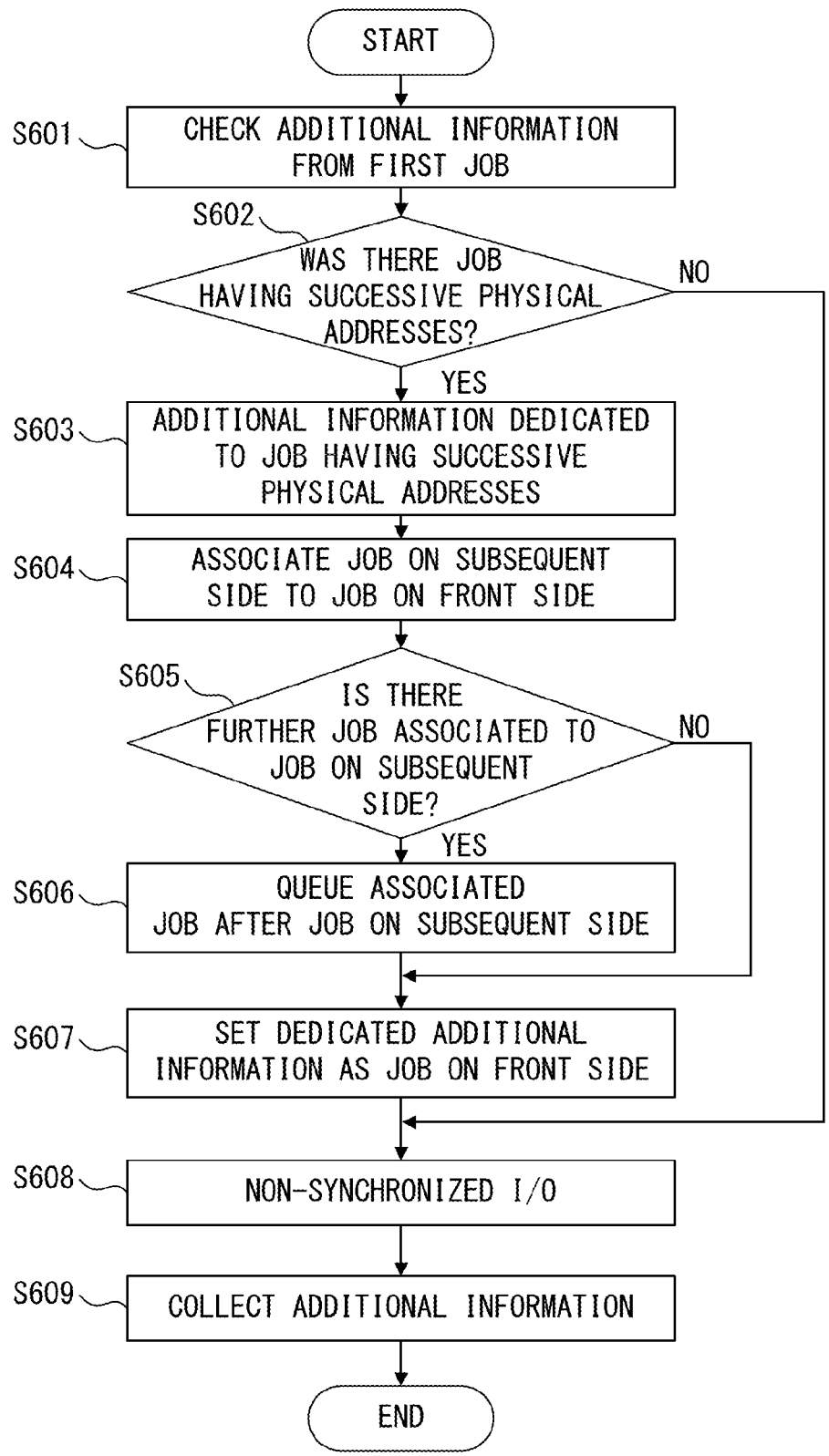
FIG. 17 illustrates a flowchart explaining an example of integrating write requests to successive physical addresses.

FIG. 17 illustrates a flowchart explaining an example of integrating write requests to successive physical addresses. The control unit 201 checks additional information of jobs that have been queued starting from the job queued at the top (step S601). The control unit 201 determines whether or not there are jobs having successive physical addresses (step S602). The control unit 201 generates additional information dedicated to jobs having successive physical addresses (step S603 and YES in step S602). The control unit 201 performs setting so that jobs that have been queued on the subsequent side having successive and parallel physical addresses are executed when the top job from among jobs having successive physical addresses is executed (step S604). The control unit 201 determines whether or not subsequent jobs having successive physical addresses hold jobs that are executed further parallelly (step S605). The control unit 201 queues jobs executed parallelly to jobs further subsequent to the jobs having successive physical addresses (step S606 and YES in step S605). The control unit 201 sets the dedicated additional information as the top job among jobs having information of successive physical addresses (step S607 and NO in step S605). The control unit 201 executes non-synchronized I/O (step S608 and NO in step S602). The control unit 201 collects additional information of all jobs (step S609). The control unit 201 terminates the process of integrating write requests to successive physical addresses.

Figure 18:
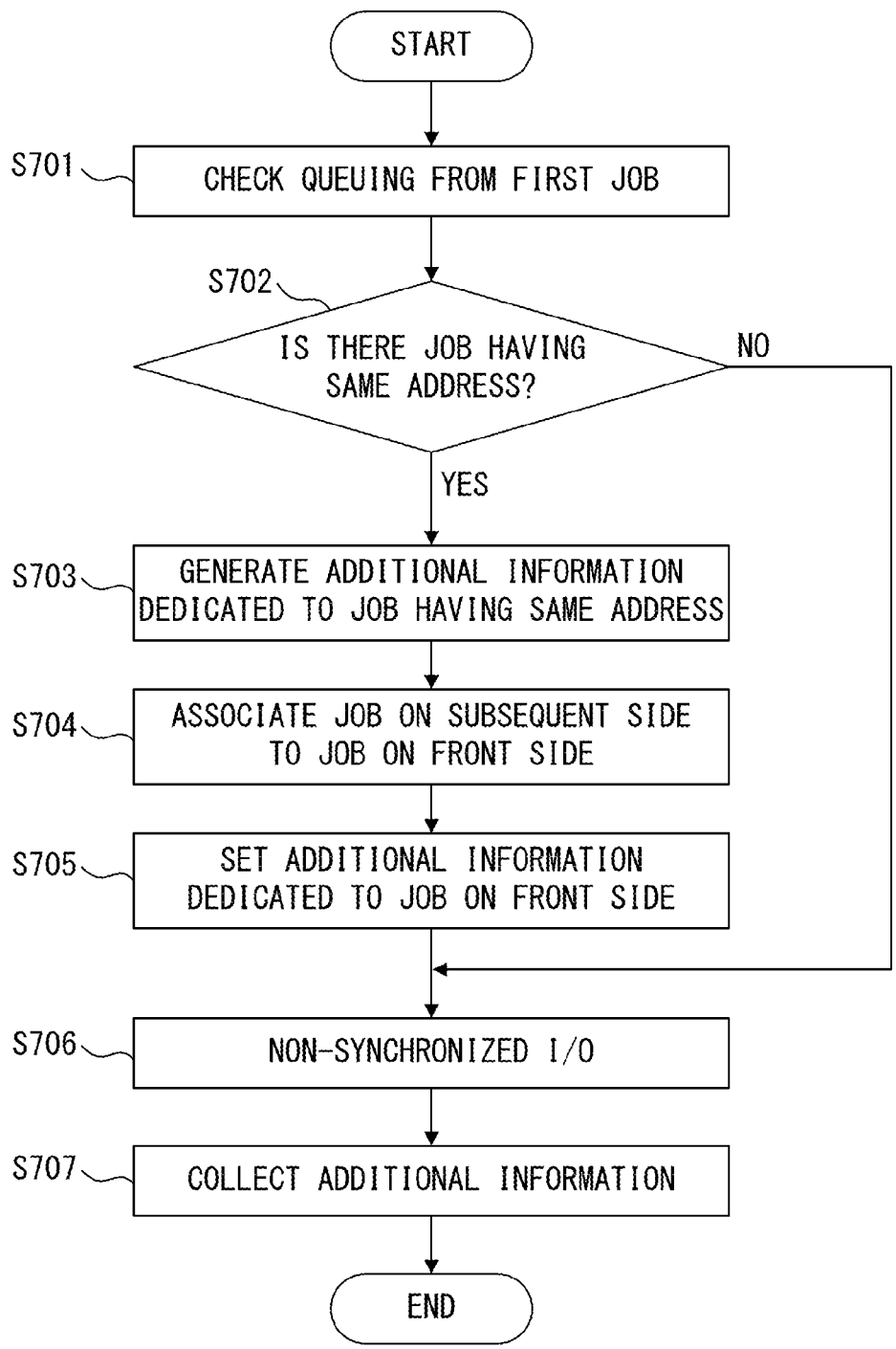
FIG. 18 illustrates a flowchart explaining an example of integrating write requests to a data slice.

FIG. 18 illustrates a flowchart explaining an example of integrating write requests to a data slice. The control unit 201 checks additional information of jobs that have been queued starting from the job queued at the top (step S701). The control unit 201 determines whether or not there are jobs having the address of the same master slice (step S702). The control unit 201 generates additional information dedicated to the jobs having information of the address of the same master slice (step S703 and YES in step S702). The control unit 201 performs setting so that jobs that have been queued on the subsequent side are executed when jobs queued on the front side from among jobs having the information of the address of the same master slice is executed (step S704). The control unit 201 sets the dedicated additional information to jobs queued on the front side (step S705). The control unit 201 executes non-synchronized I/O (step S706 and NO in step S702). The control unit 201 collects additional information of all jobs (step S707). The control unit 201 terminates the process of integrating write requests to the data slice.

FIG. 19 illustrates a flowchart explaining an example of down recovery of history information. The control unit 201 reads history information from a meta slice when the control unit 201 is activated (step S801). The control unit 201 obtains information of the number of data chunks that are included in the history information and that have already been written and the number of meta chunks that are being updated (step S802). The control unit 201 determines whether or not the number of meta chunks that are being updated is zero (step S803). The control unit 201 lists pieces of meta information of data for which the writing to the data slice succeeded (step S804 and NO in step S803). The control unit 201 extracts data for which the writing to the meta slice failed due to a failure (step S805). The control unit 201 determines data that has been written before data for which the writing failed as data for which the writing succeeded normally (step S806). The control unit 201 recovers the history information by using the data for which the writing succeeded normally (step S807). The control unit 201 deletes, from the meta slice, meta information written after data for which the writing failed from among the pieces of meta information listed in S804 (step S808). The control unit 201 writes the history information to the meta slice (step S809). The control unit 201 obtains the information of the number of data chunks to which the writing has already been performed (step S810 and YES in step S803).

As explained above, according to the methods of embodiments, the performance of snapshot can be maintained even when the amount of mapping information has increased accompanying the increase in scale of storage devices and systems.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device which has stored thereon original data of an update target and update data of the original data of the update target in different storage areas, comprising:
   a controller;
   a memory includes a first storage area, a second storage area, and a third storage area;
   the first storage area configured to store the original data of the update target that is to be updated by a host;
   the controller configured to divide the updated data into a plurality of pieces of data including addresses of the first storage area and to integrate a plurality of pieces of divided updated data into a group of pieces of data including successive addresses in the first storage area,
   to write, to the second storage area, the plurality of pieces of divided updated data integrated into the group of pieces of data including successive addresses in the first storage area, and
   to store, in the third storage area, mapping information in which the address of the first storage area is associated with the address of the second storage area that stores the plurality of pieces of divided updated data integrated into the group of pieces of data including successive addresses in the first storage area.

2. The storage control device according to claim 1, wherein:
   the information in which the update area address and the storage destination address is associated is information represented by storing the storage destination address in an order of a number indicted by the update area address, and is stored in the third storage area and a cache.

3. The storage control device according to claim 1, wherein:
   the controller further distributes the plurality of pieces of update data for each of identical cache pages when the information in which the update area address and the storage destination address are associated is stored in the third storage area.

4. The storage control device according to one of claim 1, wherein:
   the third storage area stores, as history information, information representing a proceeding level of a writing process of the plurality of update data to the second storage area and information representing a proceeding level of a writing process of association information, which is information in which the update area address and the storage address are associated;
   the controller refers to the history information upon activation, determines, as update data that was normally executed, data processed prior to update data whose writing process of the association information has not been terminated, stores information related to the normally executed update data in the history information, and restarts backup from update data whose writing process of the association information has not been terminated when the history information includes information related to update data whose writing process of association information has not been terminated before the controller stops.

5. The storage control device according to claim 2, wherein:
the controller determines whether the plurality of pieces of update data are data to which a sequential access is made or data to which a random access is made; and
the controller stores beforehand in the cache a cache page next to a cache page including an address that specifies an area on which overwriting of the plurality of pieces of update data is performed when the plurality of pieces of update data are data to which a sequential access is made.

6. A control method that causes a storage device, which has stored thereon original data of an update target and updated data of the original data of the update target in different storage areas, to execute a process comprising:
storing, using a controller, in a first storage area, the original data of the update target that is to be updated by a host;
dividing, using the controller, the updated data into a plurality of pieces of data including addresses of the first storage area and to integrate a plurality of pieces of divided updated data into a group of pieces of data including successive addresses in the first storage area;
writing, using the controller, to the second storage area the plurality of pieces of divided updated data integrated into the group of pieces of data including successive addresses in the first storage area; and
storing, using the controller, in a third storage area, mapping information in which the address of the first storage area is associated with the address of the second storage area that stores the plurality of pieces of divided updated data integrated into the group of pieces of data including successive addresses in the first storage area.

7. A computer-readable recording medium having stored therein a control program for causing a storage device, which has stored thereon original data of an update target and updated data of the original data of the update target in different storage areas, to execute a process comprising:
storing, in a first storage area, the original data of the update target that is to be updated by a host;
dividing the updated data into a plurality of pieces of data including addresses of the first storage area and to integrate a plurality of pieces of divided updated data into a group of pieces of data including successive addresses in the first storage area;
writing to the second storage area the plurality of pieces of divided updated data integrated into the group of pieces of data including successive addresses in the first storage area; and
storing, in a third storage area, mapping information in which the address of the first storage area is associated with the address of the second storage area that stores the plurality of pieces of divided updated data integrated into the group of pieces of data including successive addresses in the first storage area.

* * * * *